(12) United States Patent
Fukushima et al.

(10) Patent No.: US 11,636,877 B2
(45) Date of Patent: **\*Apr. 25, 2023**

(54) CONTENT RECORDING APPARATUS, CONTENT EDITING APPARATUS, CONTENT REPRODUCTION APPARATUS, CONTENT RECORDING METHOD, CONTENT EDITING METHOD, AND CONTENT REPRODUCTION METHOD

(71) Applicant: Panasonic Intellectual Property Management Co., Ltd., Osaka (JP)

(72) Inventors: Toshiyuki Fukushima, Osaka (JP); Tokuo Nakatani, Osaka (JP); Nobuyuki Enoki, Osaka (JP); Kazuhiro Mochinaga, Osaka (JP); Masaya Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,301

(22) Filed: Aug. 4, 2022

(65) Prior Publication Data

US 2022/0375499 A1    Nov. 24, 2022

Related U.S. Application Data

(63) Continuation of application No. 16/325,641, filed as application No. PCT/JP2018/004509 on Feb. 9, 2018, now Pat. No. 11,443,768.

(Continued)

(51) Int. Cl.
*G06F 21/00* (2013.01)
*G11B 20/00* (2006.01)
*G09C 1/00* (2006.01)

(52) U.S. Cl.
CPC .......... *G11B 20/00579* (2013.01); *G09C 1/00* (2013.01); *G11B 20/00528* (2013.01)

(58) Field of Classification Search
CPC ................ G09C 1/00; G11B 20/00528; G11B 20/00579
See application file for complete search history.

(56) References Cited

U.S. PATENT DOCUMENTS

| | | |
|---|---|---|
| 2001/0055464 A1 | 12/2001 | Miyaki et al. |
| 2009/0010342 A1 | 1/2009 | Nakano |

(Continued)

FOREIGN PATENT DOCUMENTS

JP    2015-170972 A    9/2015

OTHER PUBLICATIONS

International Search Report and Written Opinion dated Apr. 10, 2018 in International Patent Application No. PCT/JP2018/004509.

(Continued)

*Primary Examiner* — Philip J Chea
*Assistant Examiner* — Rodman Alexander Mahmoudi
(74) *Attorney, Agent, or Firm* — McDermott Will & Emery LLP

(57) ABSTRACT

A content recording apparatus includes an obtaining unit which obtains a content having a variable-length packet structure, an encrypter which generates encrypted data by encrypting the content, and a recorder which records the encrypted data in a block unit having a fixed length in a recording medium. The encrypted data includes an invalidated region unnecessary for reproduction of the content. The recorder records a size of the invalidated region in the recording medium.

4 Claims, 24 Drawing Sheets

Related U.S. Application Data

(60) Provisional application No. 62/553,390, filed on Sep. 1, 2017.

(56) References Cited

U.S. PATENT DOCUMENTS

| | | | | |
|---|---|---|---|---|
| 2009/0164801 | A1* | 6/2009 | Kawahara | G11B 20/00855 |
| | | | | 713/189 |
| 2010/0088515 | A1* | 4/2010 | Nishimoto | H04N 21/42623 |
| | | | | 380/278 |
| 2011/0128972 | A1* | 6/2011 | Thornton | C08L 9/08 |
| | | | | 370/466 |
| 2016/0373247 | A1 | 12/2016 | Yamakage | |
| 2018/0290830 | A1 | 10/2018 | Valinsky et al. | |

OTHER PUBLICATIONS

Non-Final Office Action dated Mar. 18, 2021 issued in U.S. Appl. No. 16/325,641.
Final Office Action dated Sep. 13, 2021 issued in U.S. Appl. No. 16/325,641.
Non-Final Office Action dated Mar. 29, 2022 issued in U.S. Appl. No. 16/325,641.
Notice of Allowance dated May 19, 2022 issued in U.S. Appl. No. 16/325,641.

* cited by examiner

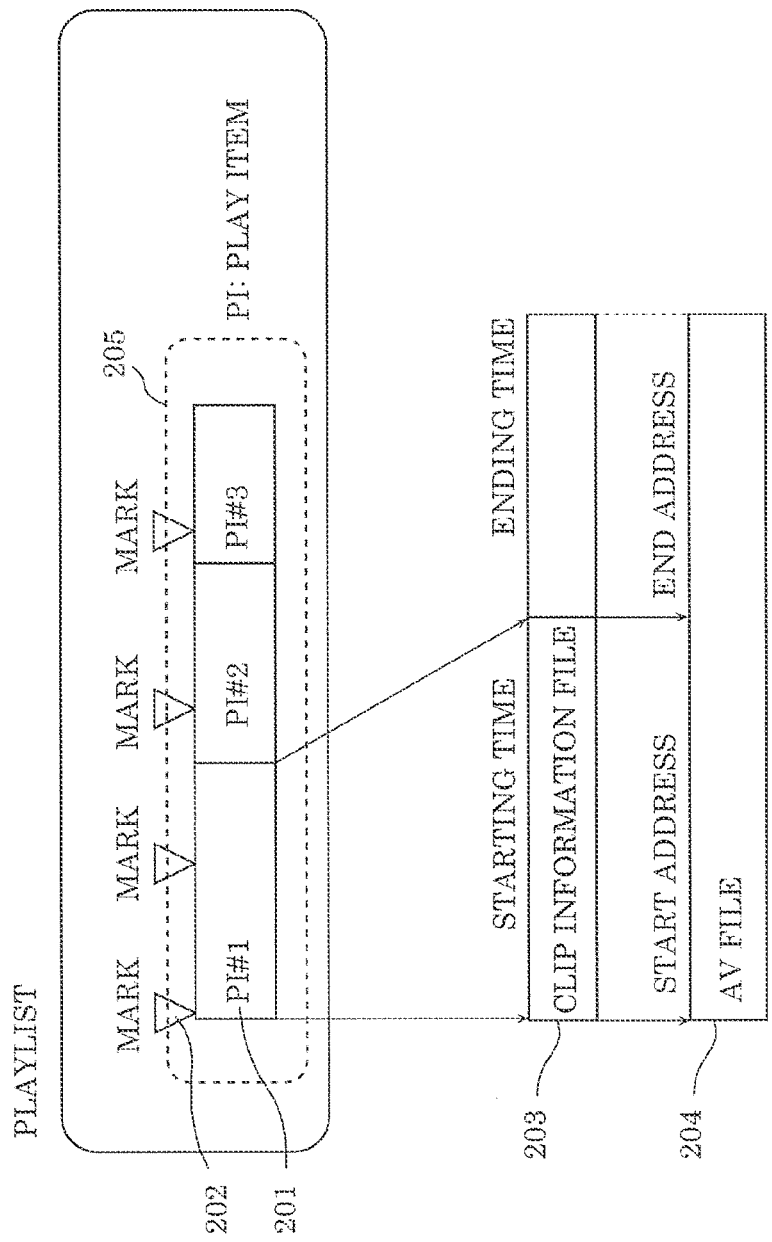

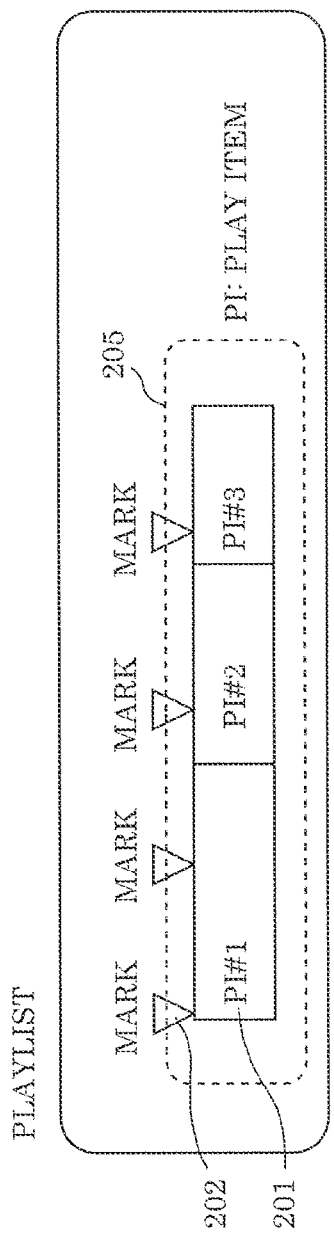
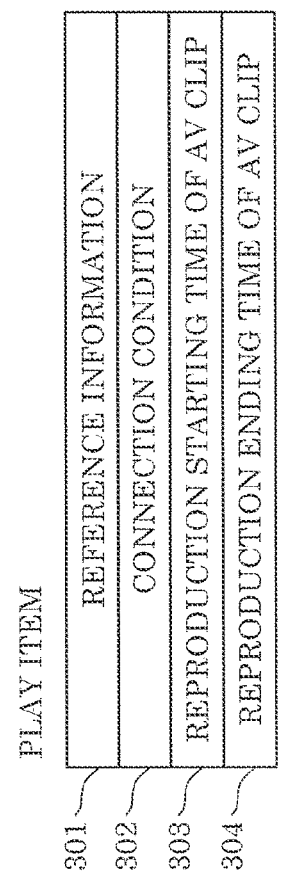

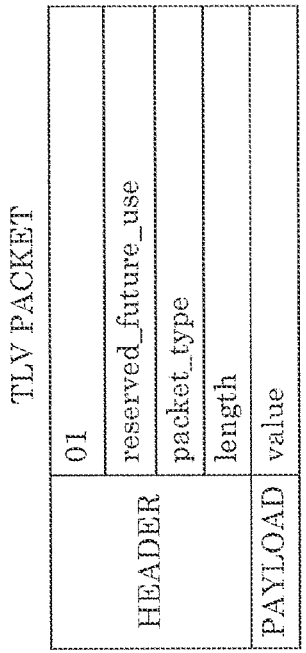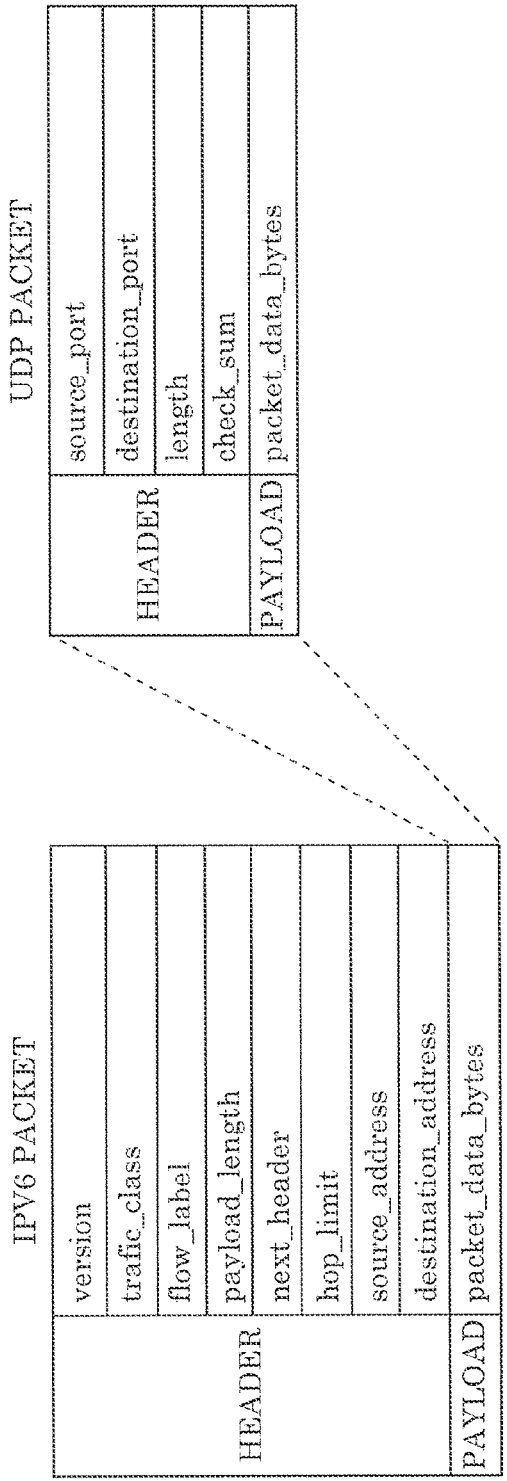

FIG. 16

MMTP PAYLOAD

| HEADER | fragmentation_indicator |
| --- | --- |
| | reserved |
| | length_extension_flag |
| | aggregation_flag |
| | fragment_counter |
| PAYLOAD | message_byte |

FIG. 17

Signal Message

| HEADER | message_id |
| --- | --- |
| | version |
| | length |
| PAYLOAD | message |

CONTENT RECORDING APPARATUS, CONTENT EDITING APPARATUS, CONTENT REPRODUCTION APPARATUS, CONTENT RECORDING METHOD, CONTENT EDITING METHOD, AND CONTENT REPRODUCTION METHOD

CROSS-REFERENCE OF RELATED APPLICATIONS

This application is a Continuation of U.S. patent application Ser. No. 16/325,641, filed on Feb. 14, 2019, which is a U.S. National Phase under 35 U.S.C. § 371 of International Patent Application No. PCT/JP2018/004509, filed on Feb. 9, 2018, which in turn claims the benefit of U.S. Provisional Application No. 62/553,390, filed on Sep. 1, 2017, the entire disclosures of which Applications are incorporated by reference herein.

TECHNICAL FIELD

The present disclosure relates to a content recording apparatus which encrypts and records multiplexed video signals and audio signals, and others.

BACKGROUND ART

An MPEG Media Transport (MMT)/Type-Length-Value (TLV) scheme is known as a multiplexing format where video signals and audio signals are treated as a single piece of digital data. PTL 1 discloses an MMT transmission system which multiplexes Internet Protcol (IP) packets including MMT Protcol (MMTP) packets in broadcast channels using a TLV scheme.

CITATION LIST

Patent Literature

PTL 1; Japanese Unexamined Patent Application Publication No. 2015-170972

SUMMARY OF THE INVENTION

Technical Problem

In the MMT/TLV scheme, the packet has a variable size. The method of recording contents having such a variable packet structure in a block unit having a fixed length in a recording medium is susceptible to examination.

This disclosure provides a content recording apparatus having a simplified recording operation.

Solution to Problem

The content recording apparatus according to one aspect of this disclosure includes an obtaining unit which obtains a content having a variable-length packet structure; an encrypter which generates encrypted data by encrypting the content; and a recorder which records the generated encrypted data in a block unit having a fixed length in a recording medium. The encrypted data includes an invalidated region unnecessary for reproduction of the content. The recorder records a size of the invalidated region in the recording medium.

It should be noted that these comprehensive or specific aspects may be implemented with a device, a system, a method, an integrated circuit, a computer program, or a recording medium such as a computer-readable CD-ROM, or may be implemented with any combination of devices, systems, methods, integrated circuits, computer programs, and recording media.

Advantageous Effect of Invention

This disclosure provides a content recording apparatus having a simplified recording operation.

BRIEF DESCRIPTION OF DRAWINGS

FIG. 4A is a diagram illustrating a concept of a playlist.
FIG. 4B is a diagram illustrating a data structure of a playlist file.
FIG. 5 is a diagram illustrating contents of play items.
FIG. 13 is a diagram illustrating a data structure of a TLV packet.
FIG. 14 is a diagram illustrating a data structure of an IP packet and that of a UDP packet.
FIG. 16 is a diagram illustrating a data structure of an MMTP payload.
FIG. 17 is a diagram illustrating a data structure of a payload region of an MMTP payload.

Figure 1:
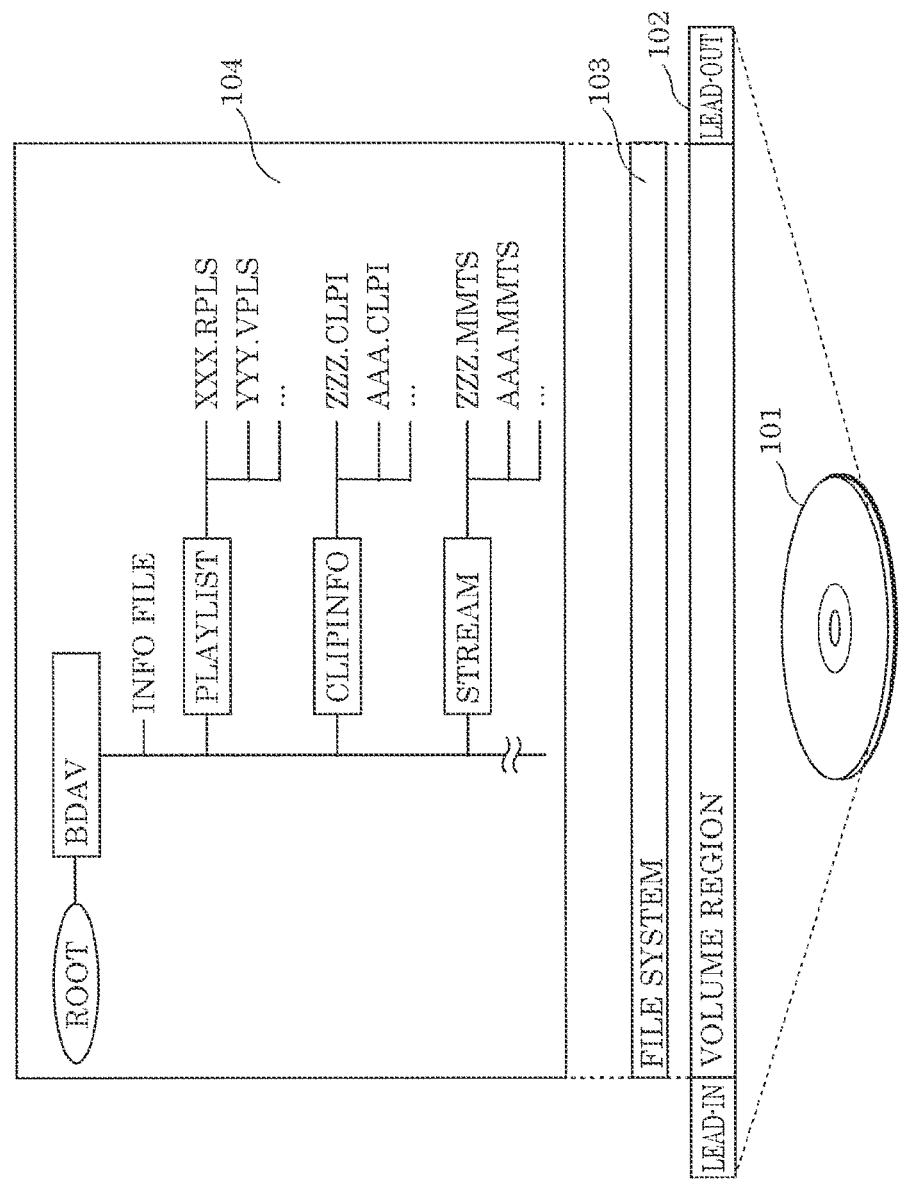
FIG. 1 is a diagram illustrating a configuration of a BD.

DESCRIPTION OF EXEMPLARY EMBODIMENT (Knowledge Underlying This Disclosure)

In the case where standard definition (SD) contents or high definition (HD) contents are provided through digital broadcast or content distribution, an MPEG2-TS scheme is usually used as a multiplexing format for transmission and accumulation of the contents.

The multiplexing format is a format for treating video signals and audio signals, which form an AV content, as a single piece of digital data. For example, video signals coded according to the MPEG4-AVC scheme and audio signals coded according to the MPEG2-AAC scheme are divided into an appropriate size. These pieces of data of divided signals are rearranged in order needed for their reproduction, and information for control is assigned thereto to form digital data. In the Japanese digital terrestrial broadcast and BS/CS digital broadcast where the MPEG2-TS scheme is used, a single unit for a video signal and that for an audio signal each are a fixed length of 188 bytes. This single unit is called a packet, and is called TS packet in the MPEG2-TS scheme.

The TS packet is composed of a TS header which stores control information, and a TS payload which stores actual video signals and audio signals. The TS header in the Japanese digital terrestrial broadcast and BS/CS digital broadcast has a fixed length of 4 bytes. The TS payload has a fixed length of 184 bytes in principle. Part of the TS payload may be used to store additional control information called Adaptation Field in some cases.

In the case where video signals and audio signals are recorded in Blu-ray (registered trademark) discs (hereinafter, also referred to as BDs), a 4-byte timestamp to instruct a read time from the BD is assigned to the leading end of the TS packet, resulting in a single unit having a fixed length of 192 bytes. This scheme is called Time Stamped TS (TTS) scheme because the timestamp is assigned. The single unit is called TTS packet.

Recently, novel, high-quality 4K contents have been focused. The traditional HD content is also called 2K content, which is composed of 1920 pixels in width and 1080 pixels in height. A 4K content has pixels twice the pixels forming a 2K content in width and in height, and is composed of 3840 pixels in width and 2160 pixels in height. Although a simple calculation tells that recording of the 4K content requires a recording volume four times that needed to record the 2K content, it is said that recent development of techniques of compressing moving pictures enables the 4K content to be recorded with a volume approximately twice that to record the 2K content. Moreover, 8K contents each composed of 7680 pixels in width and 4320 pixels in height have been also examined as contents of much higher quality.

To transmit the 4K contents or the 8K contents through broadcast signals, the advanced BS digital broadcasting and the advanced broadband CS digital broadcasting have been newly being developed. In these broadcasting techniques, the assumed transmission bandwidth is 35 Mbps (35 megabits per second) in the 4K content and 100 Mbps (100 megabits per second) in the 8K content. The development of optical discs for storing the contents obtained through such broadcastings has also been examined.

The advanced BS digital broadcasting and the advanced broadband CS digital broadcasting use an MMT/TLV scheme as a new multiplexing format to enhance the cooperation with transmission through communication. Similarly to the MPEG2-TS scheme, in the MMT/TLV scheme, video signals and audio signals are divided into an appropriate size. These divided pieces of data are rearranged in order needed for their reproduction, and information for control is assigned thereto. A major difference between the MMT/TLV scheme and the MPEG2-TS scheme is that the data size in the MMT/TLV scheme after the division is not always fixed, and may be variable in length.

Furthermore, to protect the 4K contents against unauthorized copy, the 4K contents are encrypted, for example. The encryption can be performed by the advanced encryption standard (AES) scheme usually used. The key to be used usually has a length of 128 bits.

Here, a 4K content of one hour has a size of about 15 GB. Encryption of the entire content in batch results in a complex reproduction operation in the case where the 4K content is reproduced from the middle thereof. For this reason, usually, the entire content is divided into small units, and each of these small units is encrypted. In the case where the multiplexing scheme is the MMT/TLV scheme, although the content is divided into data having a variable-length size, the boundaries of the divided pieces of data in the encrypted state cannot be determined. Accordingly, the divided pieces of data are encrypted according to the size separately determined. The size suitable for handling in the optical disc is a sector of 2 KB and a reading and writing unit or an ECC block (64 KB) composed of a group of 32 sectors. For this reason, encryption is performed in a unit of 64 KB, for example. In other words, the ECC block is a unit where errors of the recorded data are corrected.

Editing, such as deletion of part or middle of the 4K content, may be performed in some cases. For example, in some cases, a 4K content of one hour has an unnecessary portion of 30 seconds in the leading end, and the unnecessary portion is deleted. At this time, the size of the unnecessary portion corresponding to 30 seconds is not always the size corresponding to a factor of 64 KB. This causes a problem: After the deletion of the unnecessary portion, the entire content should be decoded, and then should be again encrypted in a unit of 64 KB.

Even when the content is encrypted in a unit of 64 KB, the recording sector may undergo fragmentation by repeated recording and deletion in the optical disc in some cases. In such cases, 64 KB of encrypted data may not be recorded in one ECC block. In those cases, the encrypted data cannot be immediately written, and can be written only after the next encrypted data is prepared. In other words, buffer control of the data in the recording operation has difficulties.

In consideration of such problems, the inventors have found a content recording apparatus having a simplified recording operation, a content editing apparatus having a simplified editing operation, and a content reproduction apparatus having a simplified reproduction operation.

An embodiment will now be specifically described with reference to the drawings. The embodiment described below is comprehensive or illustrative as specific examples. Numeral values, shapes, materials, components, arrangements, positions, and connection forms of the components, steps, order of the steps, and the like shown in the embodiment below are only examples, and will not limit the present disclosure. Among the components in the embodiment below, components not described in independent claims expressing the highest concept will be described as arbitrary components.

The drawings are schematic views, and are not always depicted strictly. In the drawings, identical reference numerals will be given to substantially identical configurations, and the duplication of the description will be omitted in some cases.

EMBODIMENT

[Configuration of BD]

First, a configuration of a BD will be described. FIG. 1 is a diagram illustrating a configuration of a BD.

BD 101 has track 102. Similarly to other optical discs such as a digital versatile disc (DVD) and a compact disc (CD), BD 101 has track 102, which is a spiral recording region extending from its inner circumference to its outer circumference. Track 102 illustrated in FIG. 1 is extended in the traverse direction.

Track 102 includes a lead-in in the inner circumference, a lead-out in the outer circumference, and a volume region between the lead-in and the lead-out. The volume region is a region in which logical data can be recorded. The volume region is serially numbered from the leading end. The serial number is called logical address. The data is read out of BD 101 by specifying the logical address. When the logical addresses are also physically continuous within BD 101, a data group having continuous logical addresses can be read without seeking.

Track 102 includes a special region called burst cutting area (BCA) on an inner side of the lead-in. This region can be read by optical disc drives, but not applications. For this reason, the BCA is used in copyright protection techniques.

In the volume region, the volume information of file system 103 is recorded from the leading end thereof, and application data such as video data is subsequently recorded. File system 103 represents the data recorded in BD 101 in a unit called a directory or a file. File system 103 used in BD 101 is in a universal disc format (UDF). Also in the case of personal computers (PCs) daily used, the data recorded in a hard disk is represented in a unit of a directory or a file by file system 103 called FAT or NTFS, enhancing usability. File system 103 enables reading of the recorded data in a unit of a directory or a file also in BD 101 as in standard PCs.

Specifically, BD 101 has the following directory and file structure 104. A BDAV directory is disposed immediately under a root directory (ROOT). The BDAV directory records the data treated in BD 101, such as AV contents and management information.

The BDAV directory includes an INFO file where a table for managing a playlist recorded in the disc is defined, a PLAYLIST directory, a CLIPINFO directory, and a STREAM directory.

AV clips (ZZZ.MMTS and AAA.MMTS) which store multiplexed AV contents such as videos and sounds are disposed under the STREAM directory. Clip information files (ZZZ.CLPI and AAA.CLPI) which store management information of the AV clips are disposed under the CLIP-INFO directory. Playlist files (XXX.RPLS and YYY.VPLS) which define logical reproduction paths of the AV clips are disposed under the PLAYLIST directory.

Figure 2:
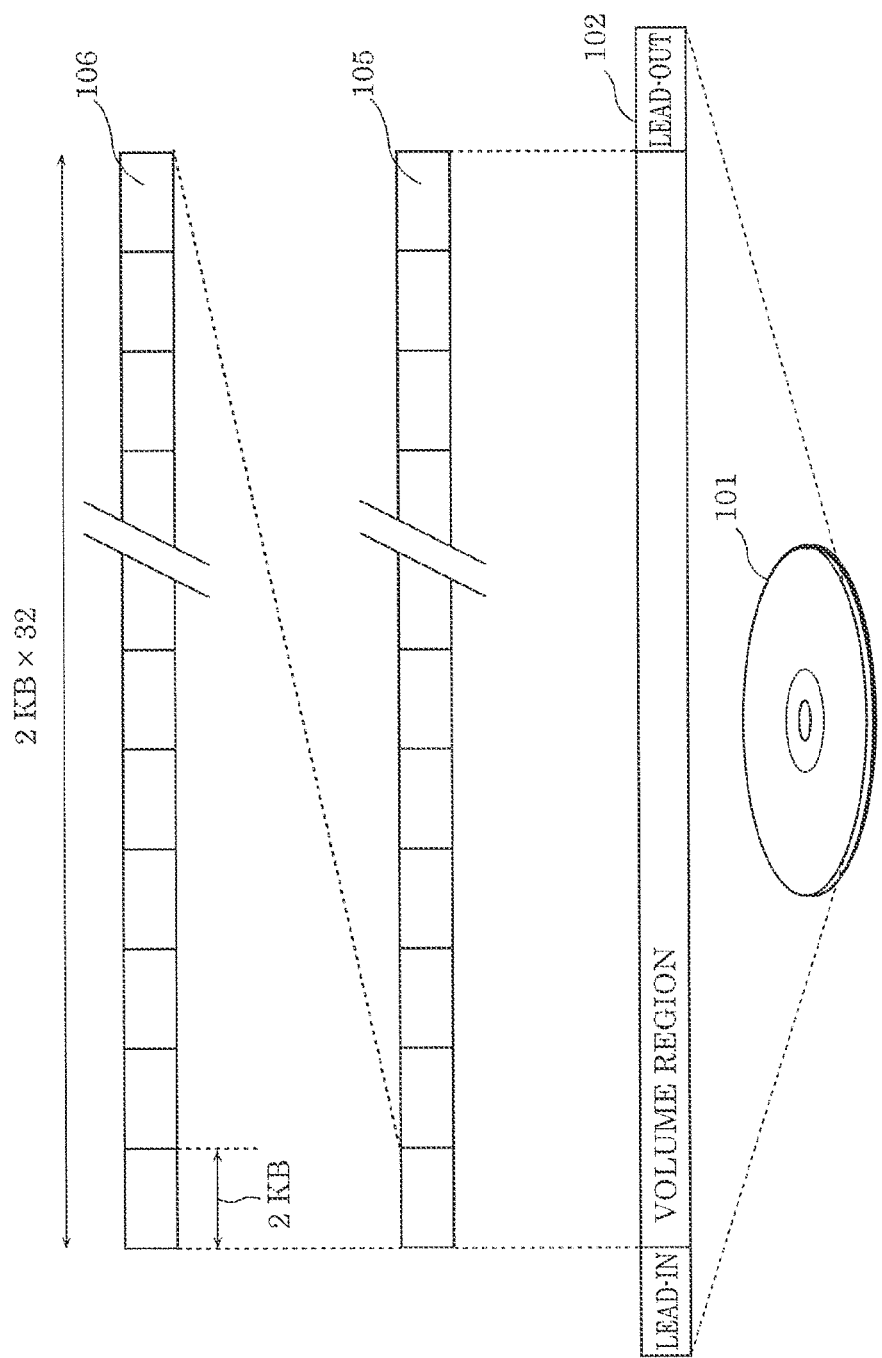
FIG. 2 is a diagram illustrating a physical structure of the BD.

The physical configuration of BD 101 will now be described. FIG. 2 is a diagram illustrating a physical structure of BD 101.

As illustrated in FIG. 2, the volume region is composed of multiple ECC blocks 105. ECC block 105 is a minimal structural unit when the optical disc drive reads and writes data from and to BD 101. The optical disc drive reads ultrafine shapes, which are physically formed on BD 101, in an analog fashion with laser light, and performs processings such as modulation and error correction on this read information to obtain 64 KB of digital data. The optical disc drive performs the reserve processings during recording, and writes 64 KB of digital data in the form of physically formed ultrafine shapes with laser light. ECC block 105 is composed of 32 sectors 106. Each sector 106 has a data size of 2 KB.

[Data Structure of INFO File]

Figure 3:
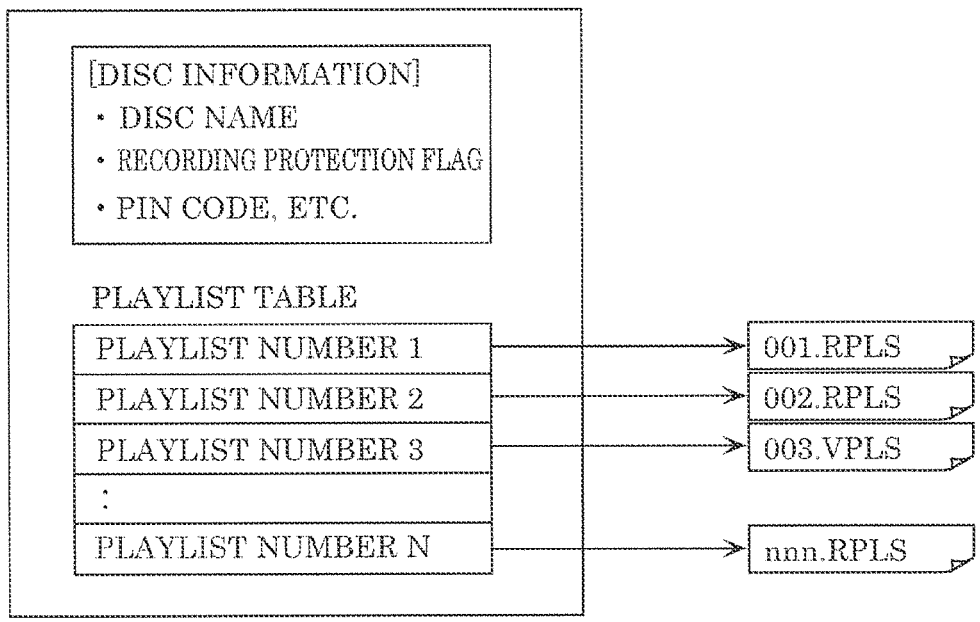
FIG. 3 is a diagram illustrating a data structure of an INFO file.

The data structure of the INFO file will now be described. FIG. 3 is a diagram illustrating a data structure of the INFO file.

As illustrated in FIG. 3, the INFO file is composed of disc information and a playlist table.

The disc information defines information associated with the contents recorded in BD 101, such as a disc name, a recording protection flag, and a PIN code. The recording protection flag represents the inhibition of editing for preventing a user from editing or deleting the content recorded in BD 101 by mistake. The PIN code is a 4-digit number used for authentication of a user. The PIN code avoids unintentional viewing of the content recorded in BD 101 by others.

The playlist table is a table defining all the playlists stored in BD 101. The playlist table specifies the playlist number. The content reproduction apparatus can display a list of playlists as a program menu using the playlist table.

[Data Structure of Playlist File]

The playlist files (XXX.RPLS and YYY.VPLS) will now be described. FIG. 4A is a diagram illustrating the concept of the playlist. FIG. 4B is a diagram illustrating a data structure of a playlist file.

The playlist represents a reproduction path of AV clip 204. As illustrated in FIGS. 4A and 4B, the playlist is composed of one or more play items 201. Each play item 201 represents a reproduction zone of AV clip 204. Each play item 201 is identified with a play item ID, and is written in the order to be reproduced within the playlist. The playlist includes entry mark 202 representing a reproduction starting point. Entry mark 202 can be assigned to the reproduction zone defined by the play item. As illustrated in FIGS. 4A and 4B, entry mark 202 is assigned to a position which can serve as the reproduction starting point of the play item, and is used for cue reproduction. The reproduction path for a series of play items is defined as main path 205, for example.

The playlist file includes two files. One of the files is a real playlist (XXX.RPLS). The real playlist is used to manage AV clip 204 recorded in BD 101. The entire zone of AV clip 204 recorded in BD 101 one-to-one corresponds to the play item in the real playlist. The content reproduction apparatus can reproduce all the AV clips recorded in BD 101 by referring to the real playlist. Deletion of the real playlist results in the deletion of AV clip 204 linked thereto.

The other file included in the playlist file is a virtual playlist (YYY.VPLS). The user can freely edit the reproduction path of AV clip 204 with the virtual playlist. The virtual playlist may refer to AV clip 204 in a partially overlapping manner. Deletion of the virtual playlist does not result in the deletion of AV clip 204.

While the real playlist and the virtual playlist can be distinguished with their extensions, the real playlist and the playlist numbers (XXX and YYY) of the virtual playlist should not be overlapped.

The contents of the play item will now be described. FIG. 5 is a diagram illustrating the contents of the play item.

The play item includes reference information 301, connection condition 302, reproduction starting time 303, and reproduction ending time 304 of AV clip 204 to be reproduced. Reproduction starting time 303 and reproduction ending time 304 are time information. For this reason, the content reproduction apparatus refers to the entry map of clip information file 203 to obtain the position information within AV clip 204 corresponding to the specified reproduction starting time and ending time, and identifies the read starting position to operate reproduction.

Connection condition 302 represents a connection type to a preceding play item. Connection condition 302 of "1" or "2" in the play item does not ensure that AV clip 204 specified by the play item is seamlessly connected to AV clip 204 specified by a play item (preceding play item) before the play item (current play item). The difference between "1" and "2" is whether AV clips 204 referred by the preceding play item and the current play item are included in a continuous STC sequence within the same AV clip 204 or not.

Connection condition 302 of "3" or "4" ensures that AV clip 204 specified by the current play item is seamlessly connected to AV clip 204 specified by the preceding play item.

In the case of connection condition 302 of "4", end processing is performed on AV clip 204 referred by the preceding play item such that seamless connection is enabled. In contrast, in the case of connection condition 302 of "3", the end processing enabling seamless connection is not performed on AV clip 204 referred by the preceding play item. For this reason, seamless connection is enabled through a bridge clip formed by cutting out part of a portion near the connection point and subjecting the part to the end processing.

[Data Structure of Clip Information File]

Figure 6:
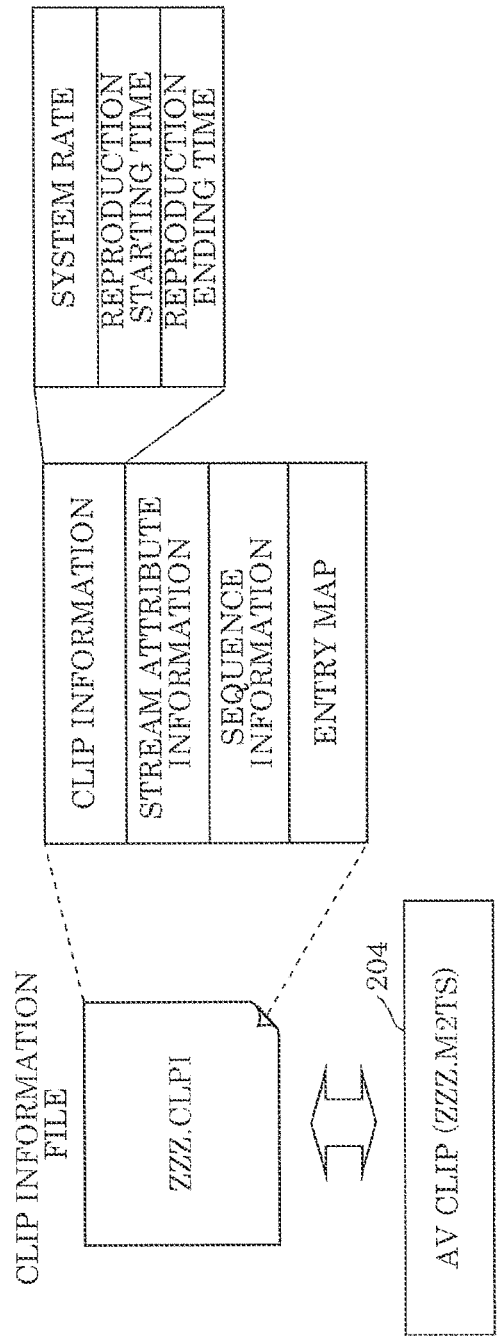
FIG. 6 is a diagram illustrating a data structure of a clip information file.

The data structure of clip information file 203 (ZZZ.CLPI) will now be described. FIG. 6 is a diagram illustrating a data structure of clip information file 203.

As illustrated in FIG. 6, clip information file 203 is the management information of AV clip 204, and one-to-one corresponds to AV clip 204. Clip information file 203 is composed of clip information, stream attribute information, sequence information, and an entry map.

The clip information is composed of a system rate, a reproduction starting time, and a reproduction ending time. The system rate represents the maximum transfer rate of the system target decoder described later to a PID filter. The reproduction starting time is the display time (PTS) of the leading video frame of AV clip 204. The reproduction ending time is the sum of the display time (PTS) of the video frame at the tail end of AV clip 204 and a reproduction interval of one frame.

Figure 7:
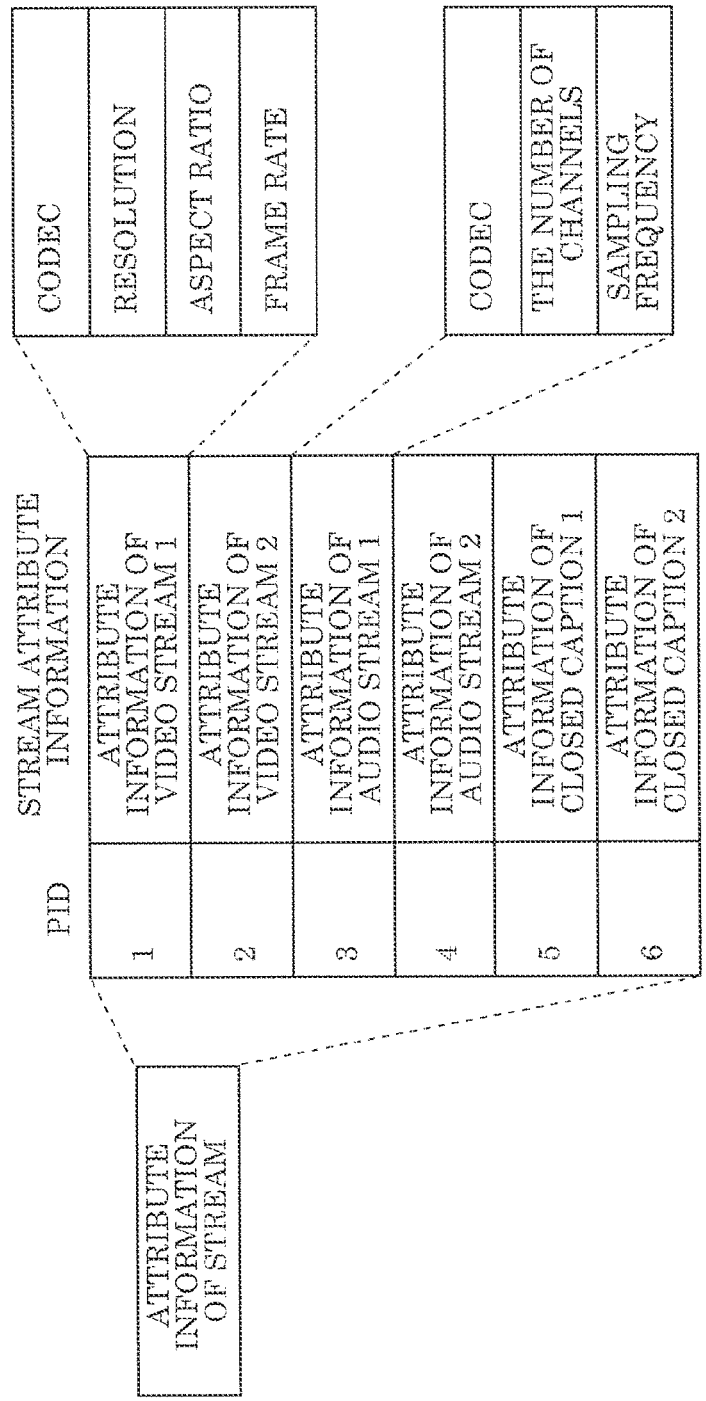
FIG. 7 is a diagram illustrating a data structure of stream attribute information.

The stream attribute information has a data structure illustrated in FIG. 7. FIG. 7 is a diagram illustrating the data structure of the stream attribute information.

In the stream attribute information, the attribute information on each stream included in AV clip 204 is registered for its corresponding PID. The attribute information is varied according to the types of stream, such as a video stream, an audio stream, and a caption stream.

The video stream attribute information includes information such as the compression codec used to compress the target video stream, the resolutions of individual pieces of picture data forming the video stream, an aspect ratio, and a frame rate. The audio stream attribute information includes information such as the compression codec used to compress the target audio stream, the number of channels included in the audio stream, and the sampling frequency. These pieces of attribute information are used to initialize the decoder before the start of reproduction in the content reproduction apparatus, for example.

The sequence information is the management information on the sequences included in AV clip 204. AV clip 204 is not always composed of a temporally continuous single block of video, audio, and caption streams. AV clip 204 may be composed of a plurality of continuous blocks of streams in some cases. In such cases, a block of streams is called a sequence. The sequence information manages the information on the sequence.

For example, in the case where a one-hour program is initially recorded, one sequence having a reproduction time of one hour is stored in one AV clip 204. Here, AV clip 204 of one hour is reedited as 40-minute AV clip 204 after deleting the part from a point at 20 minutes to a point at 40 minutes from the leading end of AV clip 204 of one hour. In this case, the first 20-minute part is considered as one sequence and the second 20-minute part is considered as the other sequence, and one AV clip 204 having a total reproduction time of 40 minutes and composed of two sequences is generated.

The sequences are individually managed as described above in order to maintain the continuity of the time information accompanying the stream. As described later, the stream stores a variety of pieces of time information such as the broadcast time of the data and the display time of each video frame. The content reproduction apparatus synchronizes the time to read or display the data using these pieces of time information, reproducing the content as a whole without failure. Here, discontinuous or duplicated time information may cause a variety of problems in synchronization. To avoid such problems, the content reproduction apparatus uses the sequence including the time information guaranteed that such duplication or discontinuity does not occur.

Figure 8:
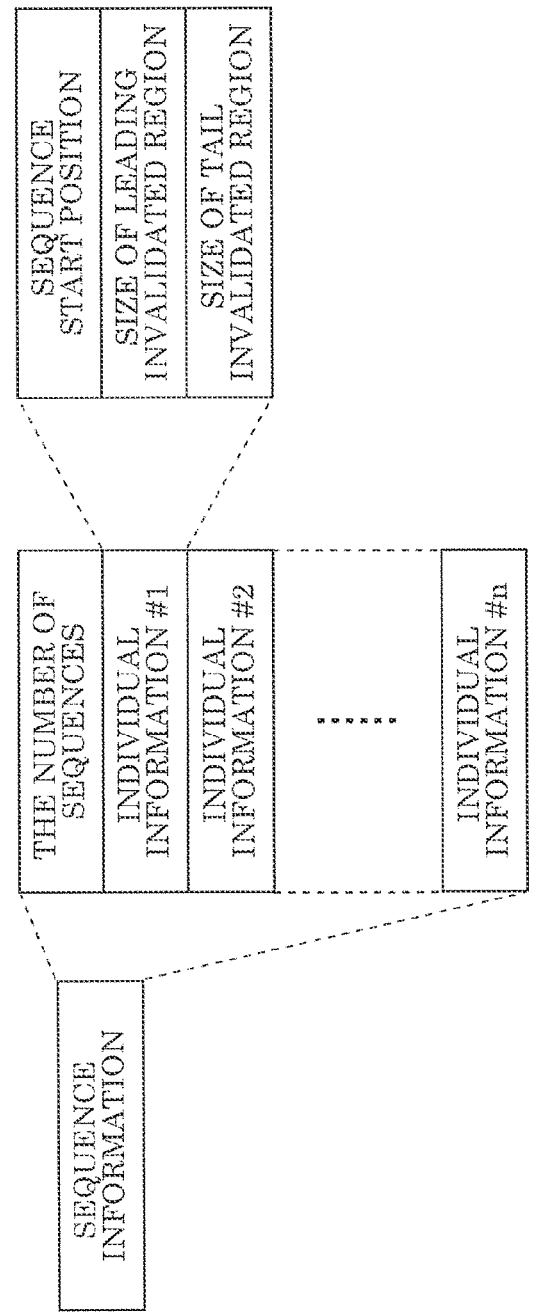
FIG. 8 is a diagram illustrating a data structure of sequence information.

FIG. 8 is a diagram illustrating a data structure of the sequence information. As illustrated in FIG. 8, the leading portion of the sequence information stores the number of sequences included in the target AV clip 204. Subsequent to the number of sequences, individual information of one or more sequences is stored.

The individual information of the sequence initially stores the recording position of the target sequence within AV clip 204. For example, the number of bytes from the leading end of AV clip 204 is stored as the recording position. The individual information of the sequence further includes the size of the leading invalidated region (which is the size of the invalidated region included in the leading portion of the target sequence), and the size of the tail invalidated region (which is the size of the invalidated region included in the tail portion of the target sequence). The size of the leading invalidated region and the size of the tail invalidated region are recorded as the size of an invalidated region in the target sequence. The size of the leading invalidated region and the size of the tail invalidated region are also represented by the number of bytes from the leading end and the tail end of the target sequence, respectively.

Figure 9:
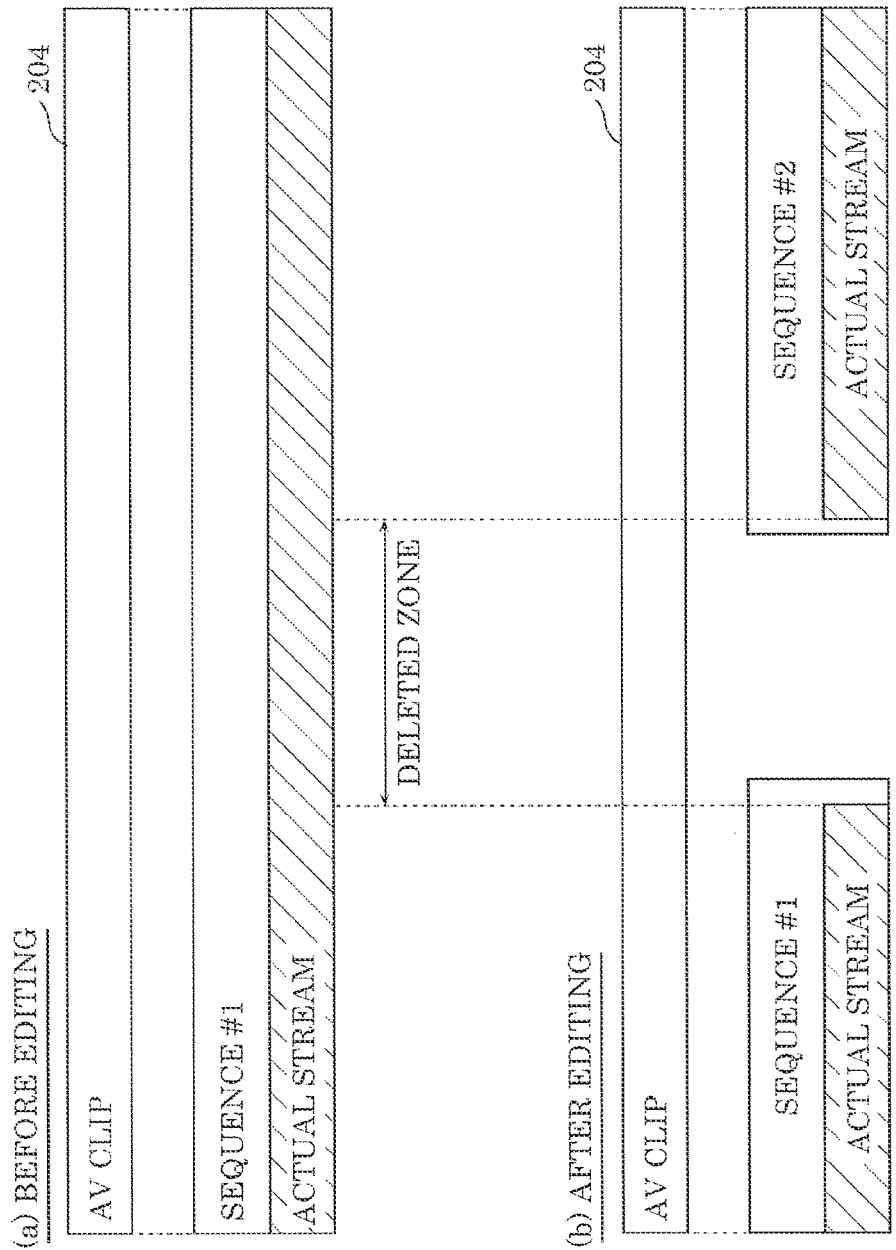
FIG. 9 is a diagram illustrating an invalidated region.

Here, the meaning of the invalidated region and a usage example thereof will be described with reference to FIG. 9. FIG. 9 is a diagram for illustrating the invalidated region.

(a) of FIG. 9 is a diagram schematically illustrating the data structure of the content initially recorded. One AV clip 204 is composed of one sequence #1. Sequence #1 records only the streams, such as actual video, audio, and caption streams.

Here, in the case where the middle portion of the AV clip is deleted as a deleted portion, as illustrated in (b) of FIG. 9, the original sequence #1 is separated into sequence #1 corresponding to a first half and sequence #2 corresponding to a second half. Sequence #1 and sequence #2 include actual streams which are not deletion targets. As described later, unnecessary data had better be left in the tail or leading end of the actual stream in some cases for encryption and reading/writing in the unit of ECC block. Unfortunately, such unnecessary data does not have a meaningful data configuration. Reproduction of such unnecessary data may cause discontinuity of the video or start of the video halfway. To prevent such failure, the unnecessary data is intentionally left as an invalidated region (in other words, the unnecessary region). The invalidated region is managed using the size of the leading invalidated region and the size of the tail invalidated region.

Figure 10:
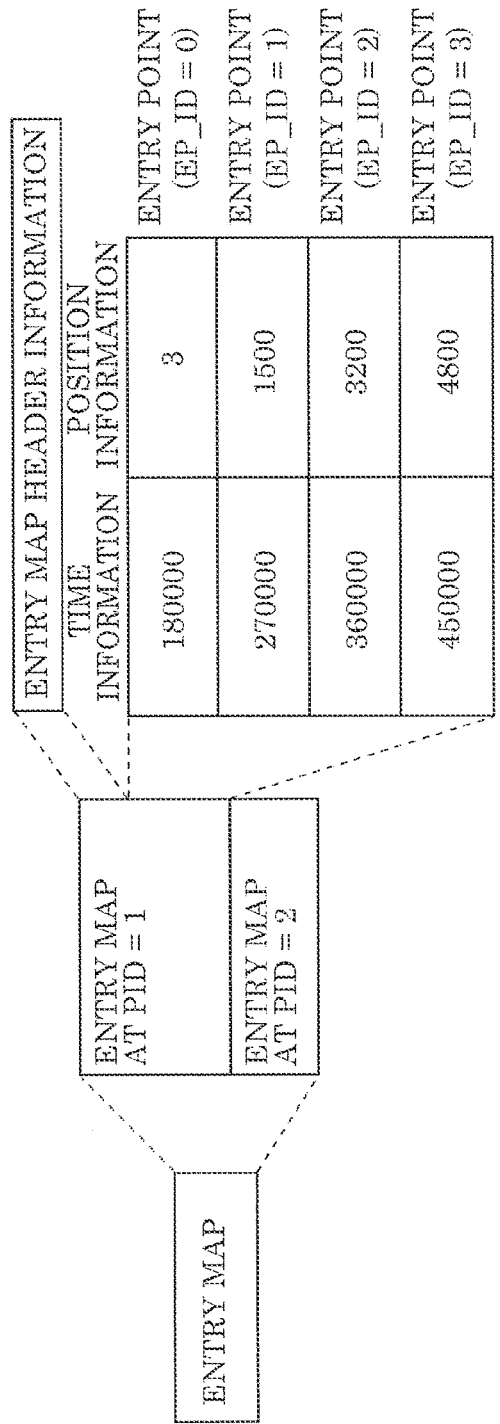
FIG. 10 is a diagram illustrating a data structure of an entry map.

As illustrated in FIG. 10, the entry map is table information describing entry map header information, time information representing the display times of I pictures of the video stream included in AV clip 204, and position information of AV clip 204 where each I picture is started. FIG. 10 is a diagram illustrating a data structure of the entry map. In the case where AV clip 204 is an MPEG-2 stream, the time information represents the time based on the system time written in the PCR packet, and the position information represents the source packet number (SPN). In the case where AV clip 204 is an MMT stream, the time information represents the time based on the UTC time written in the NTP packet, and the position information represents the number of bytes from the leading end of the stream.

Figure 11:
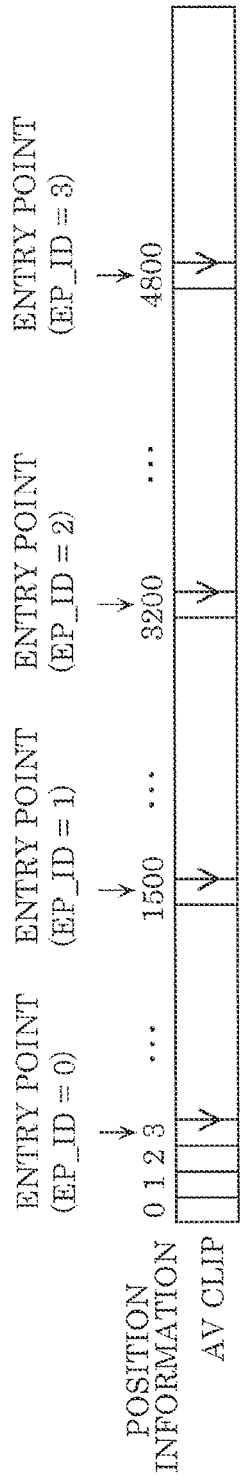
FIG. 11 is a diagram illustrating an entry point.

In FIG. 10, a pair of time information and position information included in the same column is called an entry point. The entry point ID (hereinafter, EP_ID) is represented by an increment of the leading entry point EP_ID=0. FIG. 11 is a diagram for illustrating the entry point.

Using such an entry map, the content reproduction apparatus can identify the file position of AV clip 204 corresponding to any point on the temporal axis of the video stream. For example, during special reproduction such as fast forward and rewind, the content reproduction apparatus can efficiently perform special reproduction without analyzing AV clip 204 by identifying the I picture registered in the entry map, and selectively reproducing the identified I picture.

The entry map is created for each video stream multiplexed within AV clip 204, and is managed by the PID. The entry map also stores the entry map header information at the leading end thereof, where the information such as the PID and the number of entry points of the video stream specified by the entry map is stored.

[AV Clip]

AV clip 204 (ZZZ.MMTS and AAA.MMTS) will now be described.

Two digital streams, i.e., a digital stream in an MPEG-2 TS format and a digital stream in an MMT/TLV format are used for AV clip 204. Whether AV clip 204 is in the MPEG-2 TS format or the MMT/TLV format can be determined from the extension. The overlapping of stream numbers (ZZZ and AAA) is prohibited. In this application, only AV clip 204 in the MMT/TLV format will now be described because the problems of the MMT/TLV format, where divided data for multiplexing has a variable length, will be treated.

Figure 12:
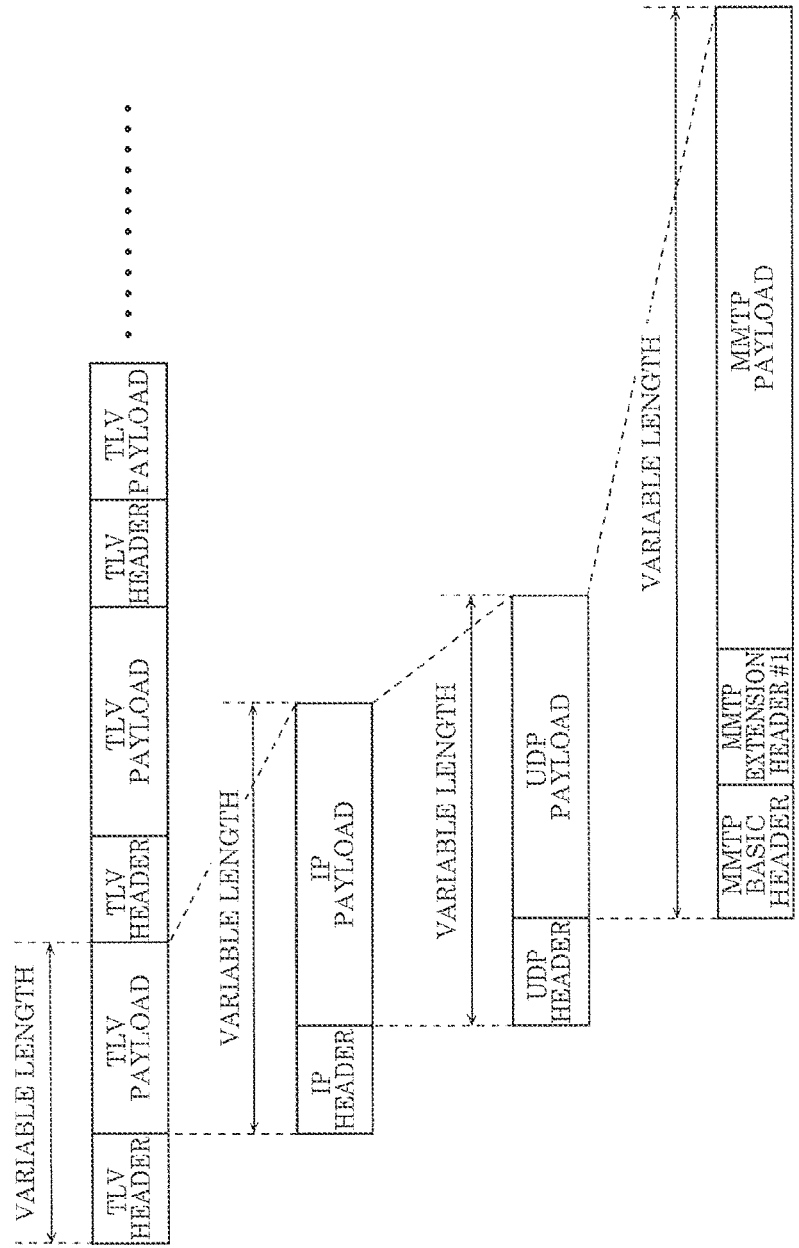
FIG. 12 is a diagram schematically illustrating a configuration of a stream in an MMT/TLV format.

FIG. 12 is a diagram schematically illustrating a configuration of a stream in the MMT/TLV format. The stream in the MMT/TLV format has a four-layer structure of a TLV packet, an IP packet, a User Datagram Protocol (UDP) packet, and an MMTP packet.

The TLV packet is a variable-length packet, and is composed of a TLV header and a TLV payload. The TLV payload has a variable length, and stores a variable-length IP packet.

The IP packet is composed of an IP header and an IP payload. While the IP header basically has a fixed length, the IP header may have a variable length in the case where there is option data. The IP header may be compressed in the MMT/TLV scheme used in the 4K/8K broadcast contents (in other words, the IP header is written in a compressed format) in some cases.

In these cases, the compression of the IP header reduces the amount of information as follows: using the fact that the information written in the IP header, such as the size and the address, barely changes in broadcasting, all the pieces of information are recorded only in part of IP packets, and the information indicating "the IP header has the same information as before" is recorded in the remaining IP packets. The compressed IP header has a length different from that of the standard IP header. The IP payload has a variable length.

The IP payload stores a variable-length UDP packet. The UDP packet is composed of a UDP header and a UDP payload. The UDP header may be compressed together with the IP header in some cases.

The UDP payload stores a variable-length MMTP packet. The MMTP packet is composed of an MMTP header and an MMTP payload. The MMTP header includes at least an MMTP basic header. While the MMTP basic header basically has a fixed length, it may have a variable length in the case where there is option data.

As in the example of FIG. 12, the MMTP basic header may be followed by an MMTP extension header. The MMTP extension header stores information on the control of encryption, for example. The MMTP extension header may have a fixed length, or may have a variable length. The MMTP extension header is followed by an MMTP payload. The MMTP payload stores the actual video stream or audio stream after division.

[Data Structure of TLV Packet]

The data structure of the TLV packet will now be described. FIG. 13 is a diagram illustrating a data structure of the TLV packet.

As described above, the TLV packet is composed of the TLV header and the TLV payload. The leading end of the TLV header has a delimiter indicating the leading end. The delimiter is always a binary numeric value 01 in 2 bits. Subsequent to this delimiter, a 6-bit field for extension in the future (reserved_future_use) is prepared. At this point of time, all the numeric values written in the field for extension in the future are 1. A numeric value 0 can be written in this field in the case where an extension is required in the future for some reason.

Subsequent to the field for extension in the future, an 8-bit packet_type is stored, which indicates the type of data stored in the TLV payload.

Although the content of the TLV payload is the IP packet in principle as described above, there are a case where an IPv4 packet is stored and a case where an IPv6 packet is stored. Moreover, the TLV payload may include a compressed IP packet where the IP header is written in a compressed format, because the values written in the IP headers of the IP packets are almost constant in the case of transmission of the TLV packet through broadcasting. Alternatively, instead of the IP packet, TLV-SI (Service Information) may be stored in the TLV payload. The TLV-SI is control information for demultiplexing the multiplexed IP packet by a receiver. Furthermore, because pieces of meaningful data are not always transmitted all the time in broadcast where TLV packets are transmitted in real time, null packets for filling gaps between these pieces of meaningful data may also be stored in the TLV payload. The packet_type described above is used to indicate the type of the packet stored in the TLV payload, i.e., either of the IP packet, the compressed IP packet, the TLV-SI, and the null packet. Subsequent to the packet_type, the length indicating the packet length of the TLV packet is stored.

[Data Structure of IP Packet]

The data structure of the IP packet will now be described. FIG. 14 is a diagram illustrating the data structure of an IP packet and that of a UDP packet. In FIG. 14, a structure of a non-compressed IPv6 packet will be illustrated as a representative example. Although the compressed IP packet and the IPv4 packet have different structures, their descriptions will be omitted.

As described above, the IP packet is composed of the IP header and the IP payload. As illustrated in FIG. 14, 4 bits of information indicating the version of the IP packet is written in the leading end of the IP header. The IPv6 packet version 6 is written in the case of the IPv6 packet.

The subsequent 8-bit traffic_class is a field defining the order of priority about the handling of the IP packets. The traffic_class is always 0 in the case where the IP packet is transmitted through broadcasting, and the operation is performed without any rule of the order of priority of the IP packets.

The subsequent 20-bit flow_label can store the information on the control of communication, and is always 0 during the operation in the case where the IP packet is transmitted through broadcasting.

The subsequent 16-bit payload_length is the information indicating the length in byte of the IP payload. This field enables handling of the variable-length IP payload. The subsequent 8-bit next_header indicates a header subsequent to the IP header. In the case where the IP packet is transmitted through broadcasting, the IP packet is always followed by the UDP header. Accordingly, a fixed value 0001 0001 is written.

The next_header is followed by an 8-bit hop_limit indicating the upper limit number of relays by a router, a 128-bit source_address indicating a source IP address, and a 128-bit destination_address indicating the destination IP address, although their detailed description will be omitted.

[Data Structure of UDP Packet]

The IP payload stores the UDP packet, and the IP header is immediately followed by the UDP header. The data structure of the UDP packet will now be described also with reference to FIG. 14.

The UDP header is composed of a source_port, a destination_port, a length, and a check_sum, each of which is 16 bits. Among these fields, the length represents the total size of the UDP header and the subsequent UDP payload in bytes. The description of the source_port, the destination_port, and the check sum will be omitted.

The UDP header is followed by the variable-length UDP payload. The UDP payload usually stores the variable-length MMTP packet. Other than the MMTP packet, the UDP payload may store a UDP packet in an NTP format for notifying a time of a receiver. For example, in the case where NTP-related information is stored in the IP payload of the IPv6 packet, FF02::101 is specified as a destination IP address. Because the IP packet in the NTP format is also transmitted as a plaintext, decoding does not need to be performed in particular.

[Data Structure of MMTP Packet]

Figure 15:
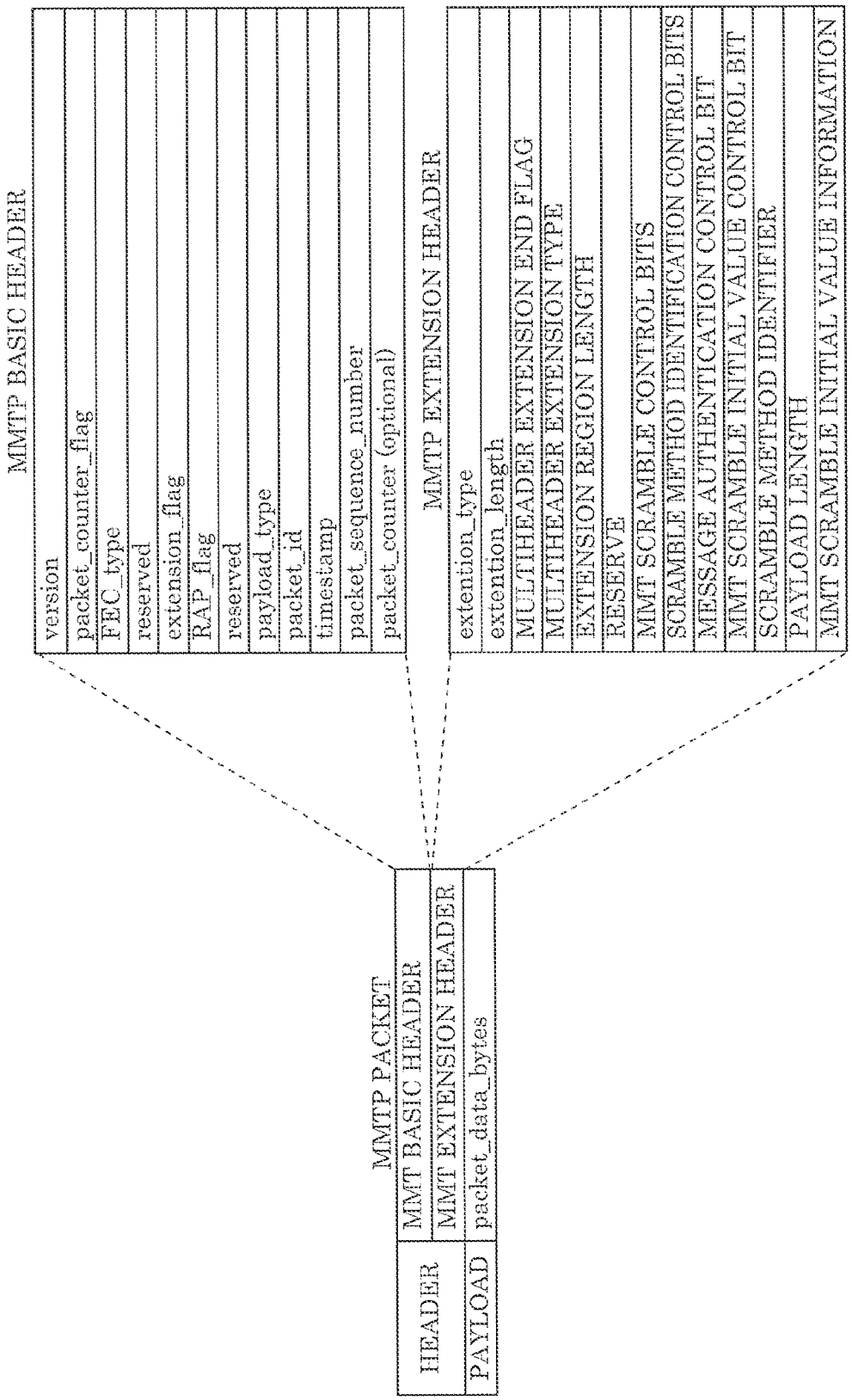
FIG. 15 is a diagram illustrating a data structure of an MMTP packet.

The data structure of the MMTP packet will now be described. FIG. 15 is a diagram illustrating the data structure of the MMTP packet.

As illustrated in FIG. 15, the MMTP packet is composed of an MMT header and an MMTP payload. The MMTP packet includes at least an MMTP basic packet.

The MMTP basic packet initially begins with a 2-bit version. The version represents the version number of an MMT protocol, and the version number 00 is specified in this field.

Subsequent to the version, a 1-bit packet_counter_flag is specified about whether a packet_counter field described later is present or not. The packet_counter_flag is 1 in the case where the packet_counter field is present, and is 0 in the case where the packet_counter field is not present. The size of the MMTP basic header varies according to the value of the packet_counter_flag. In the case of the Japanese 4K/8K broadcast, the packet_counter_flag is always 0, and the packet_counter field is not used.

The 1-bit extension_flag is a 1 bit of flag specifying whether the MMTP extension header is present or not. The extension_flag is 1 in the case where the MMTP extension header is present, and is 0 in the case where the MMTP extension header is not present. The size of the entire MMTP header and the size of the entire MMTP packet vary according to the value of the extension_flag.

The 6-bit payload_type is a flag indicating the data structure of the header portion of the MMTP payload. The payload_type is specified as 0 in the case of the MMTP payload which stores an actual content such as a video or audio content, and is specified as 2 in the case of MMTP payload which stores control information MMT-SI.

The 16-bit packet_id is the information for identifying the type of data stored in the corresponding MMTP payload. According to the value of the packet_id, the receiver can determine whether the data stored in the payload is a video signal, an audio signal, or control information (MMT-SI).

The time at which the initial byte of the MMT packet is trasmitted from a broadcasting station is written in a short form of an NTP timestamp in the subsequent 16-bit timestamp. The description of items FEC_t e (2 bits), RAP_flag (1 bit), packet_sequence_number (32 bits), and packet_counter (32 bits, option) will be omitted.

In the above-mentioned case where a numeric value 1 is specified in the extension_flag, the MMTP basic header is followed by the MMTP extension header. Although several MMTP extension headers may be written in a single MMTP packet in some cases, a single MMTP extension header is written in a single MMTP packet in the example illustrated in FIG. 15. Conversely, there are possibilities that no MMTP extension header is written in the MMTP packet at all.

In the case where the MMTP extension header is present in the MMTP packet, the initial 16 bits are an extention_type, and 0×0000 indicating a multi-type header extension is specified. Furthermore, the extention_length is specified in the next 16 bits, where the size of the MMTP extension header following this information is written in bytes.

The extention_length is followed by a 1-bit multi header extension end flag, where whether this MMTP extension header is the last one or not is written. In the case where several MMTP extension headers are written, this field has a value of 0.

Using the subsequent 15-bit multi header extension type, the type of information included in the MMTP extension header is written. In the case where the MMTP payload stores the target video or audio signal for encryption, the MMTP payload should store the information related with control of the encryption as an MMTP extension header. In this case, the multi header extension type has a value of 0×0001.

In the subsequent 16-bit field of the extension region length, the size of the MMTP extension header is written in bytes. The next 3 bits are assigned to a reserved region. The subsequent 2-bit MMT scramble control bits indicate whether the video signal or audio signal stored in the MMTP payload is encrypted or not, and if encrypted, indicates which of an even key and an odd key is used. The next 1-bit scramble method identification control bit indicates whether a scramble method identifier described later is recorded or not, and the 1-bit MMT scramble initial value control bit indicates whether MMT scramble initial value information described later is written or not. The description of a 1-bit message authentication control bit will be omitted.

In the case where the scramble method identification control bit described above is 1, an 8-bit scramble method identifier is written. Using this information, the receiver determines the encryption scheme actually used. In the case where the scramble method identifier is 0×01, a broadly used AES encryption scheme having a key length of 128 bits is used. The subsequent 16-bit payload length specifies the length of MMT scramble initial value information (described later) in a unit of bytes. Because the MMT scramble initial value information is 16 bytes in length, 0×0010 is specified in the payload length.

Finally, counter information is written in the MMT scramble initial value information. The counter information is an initial value in the case where the AES encryption scheme is used. In the case where the MMT scramble initial value control bit is 0, the counter information used is a value obtained by calculating using the value of packet_sequence_number or packet_id, rather than the value written in the MMT payload scramble initial value information.

[Data Structure of MMTP Payload]

The data structure of the MMTP payload in the case where MMT-SI is stored in the MMTP payload will now be described. FIG. 16 is a diagram illustrating the data structure of the MMTP payload.

The MMTP payload is further separated into a header region and a payload region. The header region includes a 2-bit fragmentation_indicator stored in its leading section. The fragmentation_indicator indicates whether the MMT-SI to be stored in the MMTP payload is divided and recorded or not.

Although a single MMTP packet usually has a size around 1500 bytes, the control information to be stored as the MMT-SI may have a size beyond 1500 bytes. In such a case, the MMT-SI is divided and stored in a plurality of MMTP packets. The fragmentation_indicator specifies whether the MMT-SI is stored in a single MMTP packet without being divided (binary number 00) or not, whether the leading portion of the divided MMT-SI is included (binary number 01) or not, whether an intermediate portion of the divided MMT-SI is included (binary number 10) or not, or whether the tail portion of the divided MMT-SI is stored (binary number 11) or not. The Japanese 4K/8K broadcast has a specification that the MMT-SI is divided into three at a maximum, therefore ensuring that the intermediate portion is the second division and the tail portion is the third division (or the second division if the preceding division is the leading portion).

Detailed descriptions of the 1-bit length_extension_flag, the 1-bit aggregation_counter, and the 8-bit fragment_counter will be omitted.

[Data Structure of Payload Region of MMTP Payload]

The data structure in the case where the MMT-SI is stored in the payload region of the MMTP payload will now be described. FIG. 17 is a diagram illustrating the data structure of the payload region of the MMTP payload.

The payload region of the MMTP payload includes a 16-bit message_id in its leading end, the message_id indicating the type of the MMT-SI. The MMT-SI includes ECM/EMM related with the control of scramble, and MPT/PLT indicating the correspondence of a video stream or an audio stream to a group of MMTP packets. A message_id is assigned to each MMT-SI.

Figure 18:
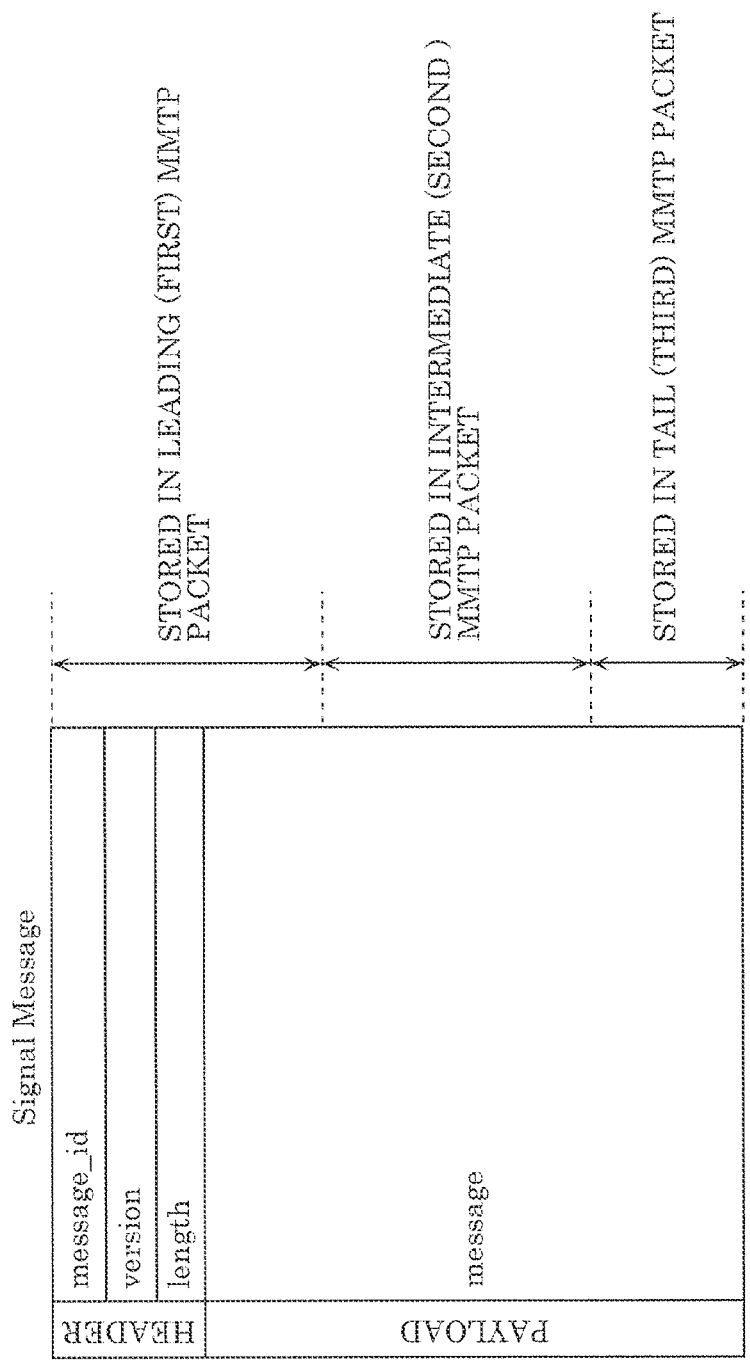
FIG. 18 is a diagram illustrating a method of dividing MMT-SI.

The subsequent 8-bit version indicates the version of the MMT-SI. The next 32-bit length indicates the number of bytes of the MMT-SI. To be noted, the number of bytes indicated here represents the number of bytes of the MMT-SI before division, rather than the number of bytes of the MMT-SI stored in the MMTP packets. In this case, the length is stored only in the leading MMTP packet, although the MMT-SI is divided into three at a maximum and stored as described above. FIG. 18 is a diagram illustrating a method of dividing the MMT-SI.

As illustrated in FIG. 18, a single piece of MMT-SI includes a header region, which is composed of a message_id, a version, and a length, in its leading portion, and includes an actual message portion following the leading portion. The MMT-SI is divided as it keeps such a data structure. According, the length is stored only in the leading MMTP packet.

Here, as described using FIGS. 16 and 17, the MMTP packet itself does not include any information indicating the lengths related with the MMTP packet and the MMTP payload other than the length information described in the leading portion of the MMT-SI. In the case where a video stream or an audio stream, rather than the MMT-SI, is stored in the MMTP packet, the size of the video or audio stream data stored in the MMTP packet is stored in the leading region of the MMTP payload.

[Content Recording Apparatus]

Figure 19:
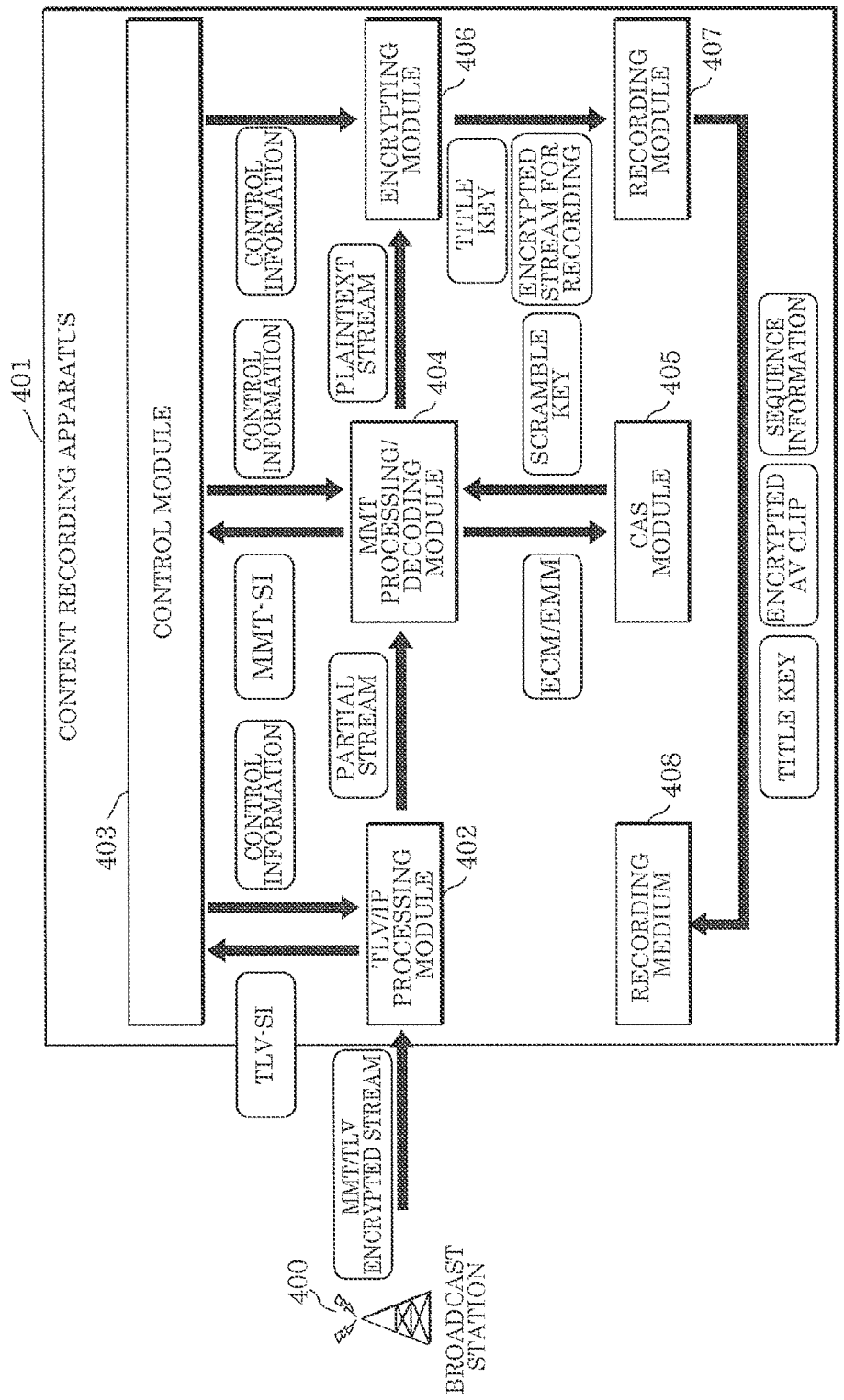
FIG. 19 is a diagram illustrating a configuration of a content recording apparatus according to an embodiment.

The configuration of the content recording apparatus according to an embodiment will now be described. FIG. 19 is a diagram illustrating the configuration of the content recording apparatus according to the embodiment.

As illustrated in FIG. 19, content recording apparatus 401 includes TLV/IP processing module 402, control module 403, MMT processing/decoding module 404, conditional access system (CAS) module 405, encrypting module 406, and recording module 407. These modules each are implemented with a microcomputer, a processor, or a dedicated circuit, for example. These modules may be implemented as a single integrated circuit.

The content is transmitted as an encrypted stream multiplexed by the MMT/TLV scheme from broadcast station 400 to content recording apparatus 401. The broadcast signals from broadcast station 400 are converted by a tuner (not illustrated in FIG. 19) from analog signals to digital signals, which are output to TLV/IP processing module 402 as an encrypted stream in the MMT/TLV format.

In other words, content recording apparatus 401 is a receiver which receives the encrypted stream from broadcast station 400. Content recording apparatus 401 is typically a BD recorder, into which recording medium 408 is inserted. Recording medium 408 is specifically BD 101. Content recording apparatus 401 may be a television receiver or a set top box (STB), to which an external hard disk drive (HDD) is connected through USB connection, for example. In other words, recording medium 408 is not limited to an optical disc such as BD 101, and may be a hard disk.

TLV/IP processing module 402 performs signal processing on the encrypted stream in the MMT/TLV format. TLV/IP processing module 402 specifically performs processing related with TLV-SI and processing related with NTP as needed.

For example, in the case where the data stored in the TLV payload is the TVL-SI, TLV/IP processing module 402 outputs the data to control module 403. Because the TLV-SI is transmitted in a plaintext, decoding or the like does not need to be performed in particular. In this case, according to the information written in the TLV-SI, control module 403 controls the operations of TLV/IP processing module 402, MMT processing/decoding module 404, and encrypting module 406.

TLV/IP processing module 402 simply neglects the data in the case where the data stored in the TLV payload is a null packet. In contrast, TLV/IP processing module 402 further continues the processing related with the IP packet in the case where the information in the TLV payload is an IP packet or a compressed IP packet.

TLV/IP processing module 402 outputs a partial stream to MMT processing/decoding module 404. The partial stream is obtained by discarding the TLV-NULL and the TLV-SI as needed.

The partial stream is converted into a plaintext stream through decoding by MMT processing/decoding module 404. Here, in the case where the data stored in the MMTP payload is the MMT-SI, MMT processing/decoding module 404 further identifies the content of the MMT-SI according to the value of the message_id (see FIG. 17 above), and outputs this content to control module 403 or CAS module 405 as needed.

Examples of the information which should be output to CAS module 405 include an Entitlement Management Message (EMM) including contract information of each subscriber and a work key for deciphering the encryption of common information, or an Entitlement Control Message (ECM) including information related with a program and a key needed for decoding. MMT processing/decoding module 404 outputs the information other than the above information to control module 403. The information output to control module 403 is used for control of MMT processing/decoding module 404 and encrypting module 406.

In the case where the data stored in the MMTP payload is the MMT-SI, MMT processing/decoding module 404 does not need to perform decoding because the MMT-SI is basically a plaintext. The EMM or the ECM, which is encrypted, is decoded by CAS module 405.

As described above, in the case where the MMT-SI is divided, MMT processing/decoding module 404 itself cannot determine the length of the MMTP packet. However, MMT processing/decoding module 404 can more appropriately perform processing by obtaining the information related with the length of the MMTP packet from TLV/IP processing module 402.

Figure 20:
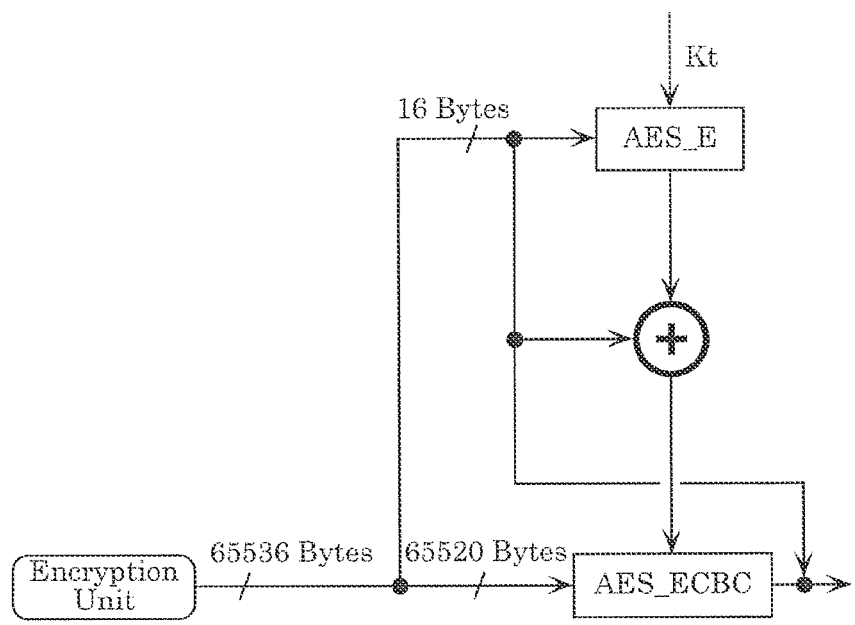
FIG. 20 is a diagram illustrating an encryption method in an encrypting module.

Encrypting module 406 obtains the plaintext stream from MMT processing/decoding module 404 to encrypt the plaintext stream. FIG. 20 is a diagram for illustrating the encryption method by encrypting module 406.

The plaintext stream is encrypted using data called a title key (represented as Kt in FIG. 20). Here, each target data of 65536 bytes for encryption is separated into the leading portion of 16 bytes and the remaining portion of 65520 bytes. Encrypting module 406 performs processing called AES_E, which is encryption by the Advanced Encryption Standard (AES) encryption scheme, on the leading portion of 16 bytes using the title key described above. Encrypting module 406 further XORs the thus obtained data and the data of the leading portion of 16 bytes, and encrypts the data of the remaining portion of 65520 bytes in an AES-CBC (Cipher Block Chaining) mode using this XORed result as a key. As a result, the data of an encrypted text is obtained. The data of the leading portion of 16 bytes is added to the data of the encrypted text to obtain an encrypted text of 65520 bytes. Such an encryption method (excluding the size of the encryption unit) is a scheme used in the Advanced Access Content System (AACS), which is a copyright protection scheme for BD 101, and is already implemented in a variety of LSIs. Use of such an encryption method enables encryption without developing any new encryption method.

Figure 21:
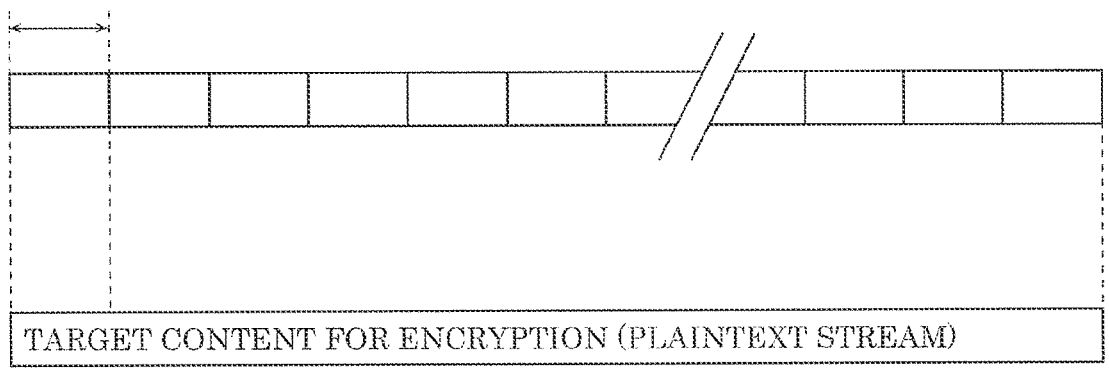
FIG. 21 is a diagram illustrating a relation between a target content for encryption and an encryption unit.

Encrypting module 406 encrypts the target content (plaintext stream) for encryption for each encryption unit. FIG. 21 is a diagram for illustrating the relation between the target content for encryption and its encryption unit.

The target content for encryption is converted into a plaintext through the decoding by MMT processing/decoding module 404 described above. The target content for encryption is divided into encryption units each having a size of 65536 bytes (64 KB) from the leading end in a sequential manner. Each encryption unit is encrypted using the encryption method described above in FIG. 20.

The encryption unit is 64 KB in size because the ECC block in the optical disc such as BD 101 has a size of 64 KB and the size of the encryption unit is matched with the size of the ECC block. A single encryption unit may have a size of n of ECC blocks (where n is an integer of 2 or more; for example, n=3), or n of encryption units may have a size of a single ECC block.

Encrypting module 406 outputs the encrypted plaintext stream as an encrypted stream for recording. The encrypted stream for recording together with the title key used during the encryption is output to recording module 407.

Recording module 407 records the title key and the encrypted stream for recording in recording medium 408. Recording medium 408 is an optical disc such as BD 101, for example. Recording medium 408 may be a recording medium in any other form. In the case where content recording apparatus 401 is a television set, recording medium 408 may be an external hard disk (HDD) connected thereto through USB connection. In the case where content recording apparatus 401 is a BD recorder, recording medium 408 may be an internal hard disk (HDD) built in content recording apparatus 401.

Although for simplicity, in the above description, the title key might appear to be stored in recording medium 408 as it is, the title key should be further protected and recorded in recording medium 408 from the viewpoint of security. In the case where recording medium 408 is an internal HDD built in content recording apparatus 401, the title key is encrypted using a device key included in content recording apparatus 401, and then recorded, for example. In the case where recording medium 408 is an optical disc such as BD 101, the title key is encrypted using a media key unique to each medium, and then recorded, for example.

Figure 22:
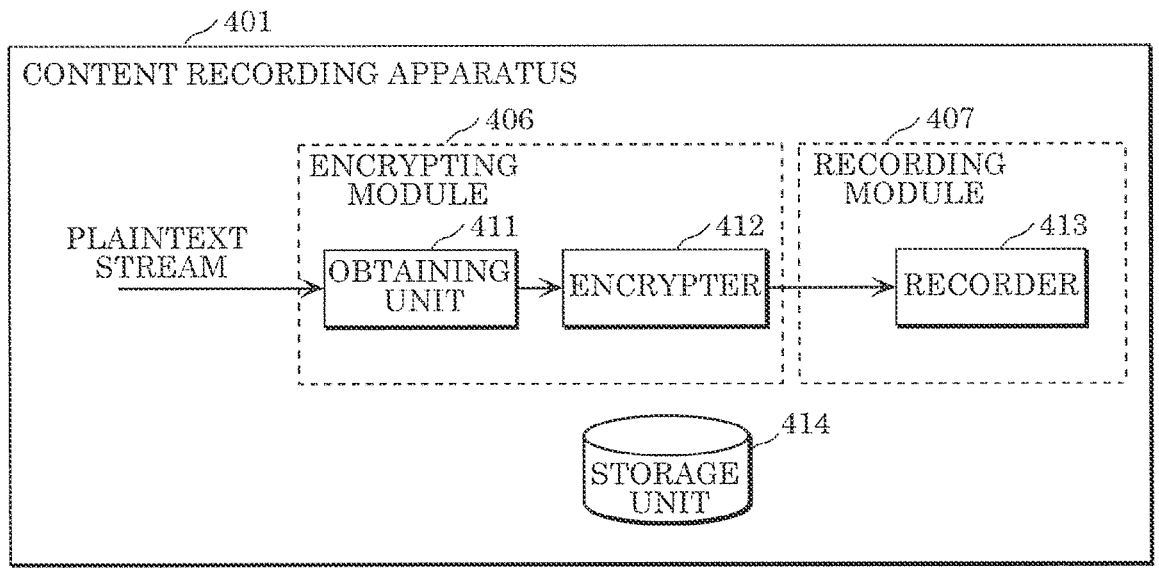
FIG. 22 is a block diagram illustrating a functional configuration of a content recording apparatus according to an embodiment.
Figure 23:
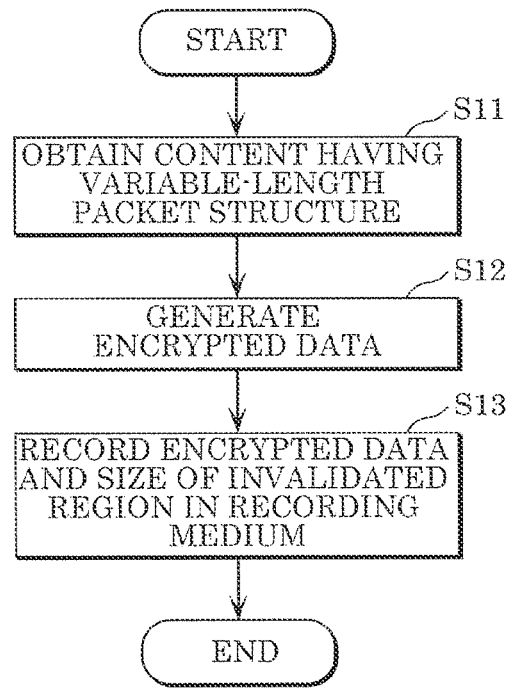
FIG. 23 is a flowchart illustrating an operation of a content recording apparatus according to an embodiment.

The functional configuration of content recording apparatus 401 may be implemented as in FIG. 22. FIG. 22 is a block diagram illustrating the functional configuration of content recording apparatus 401. FIG. 23 is a flowchart of an operation of content recording apparatus 401.

As illustrated in FIG. 22, content recording apparatus 401 includes obtaining unit 411, encrypter 412, recorder 413, and storage unit 414.

Obtaining unit 411 obtains a content having a variable-length packet structure (S11). Obtaining unit 411 corresponds to part of encrypting module 406, for example. The content having a variable-length packet structure is a plaintext stream output from MMT processing/decoding module 404, for example.

Encrypter 412 generates encrypted data by encrypting the obtained content (S12). Encrypter 412 corresponds to part of encrypting module 406, for example. Encrypter 412 generates an encrypted stream for recording as encrypted data by the encryption method described above.

Recorder 413 records the generated encrypted data in a block unit having a fixed length in recording medium 408 (S13). Recorder 413 also records the sizes of the invalidated regions (the size of the leading invalidated region or the size of the tail invalidated region in FIG. 8) in recording medium 408 (S13). Recorder 413 corresponds to recording module 407, for example. The block having a fixed length specifically refers to an ECC block, and has a data length of 64 KB. The encrypted data recorded in recording medium 408 is also represented as an encrypted AV clip.

Storage unit 414 is a storage which stores programs for obtaining unit 411, encrypter 412, and recorder 413 to perform the recording operations. Storage unit 414 is implemented with a semiconductor memory, for example. Obtaining unit 411, encrypter 412, and recorder 413 each are implemented with a microcomputer or a processor, for example, to perform the program.

[Specific Example of Recording of Encrypted Stream for Recording]

Figure 24:
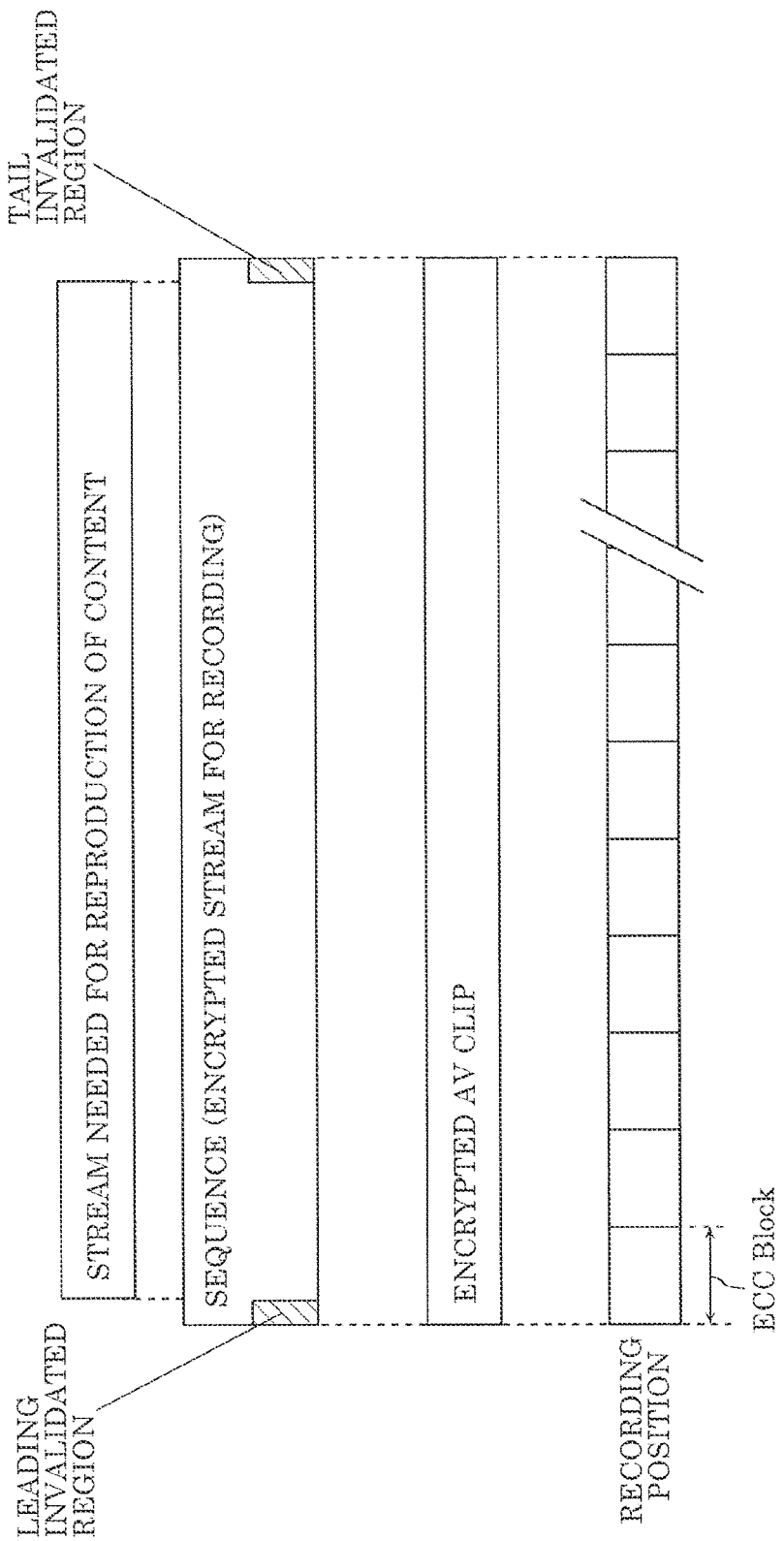
FIG. 24 is a schematic view illustrating recording positions of an encrypted stream for recording and invalidated regions.

A specific example of recording of the encrypted stream for recording in the recording medium will now be described. FIG. 24 is a schematic view illustrating recording positions in the encrypted stream for recording and the invalidated regions.

While recorder 413 records the encrypted stream for recording (in other words, a sequence) generated by encrypter 412 as an encrypted AV clip, there are cases where the leading position of the stream needed for reproduction of the content does not match the leading position of the ECC block for some reasons. In other words, in some cases, the leading portion of the encrypted stream for recording (i.e., encrypted data) generated by encrypter 412 includes an invalidated region unnecessary for reproduction of the content. In some cases, the invalidated region stores dummy data, and encrypter 412 generates an encrypted stream for recording including the dummy data in the leading end.

In such cases, recorder 413 records the encrypted stream for recording including the invalidated region as an encrypted AV clip. As a result, the invalidated region in the leading portion, i.e., a sequence including a first invalidated region (i.e., the encrypted data including the first invalidated region) is included in the encrypted AV clip. For this reason, recorder 413 stores the size of the leading invalidated region or the size of the first invalidated region in the sequence information (illustrated in FIG. 8) such that the content reproduction apparatus can specify the first invalidated region. In other words, recorder 413 records the size of the first invalidated region in recording medium 408.

Usually, the size of the stream needed for reproduction of the content is not always an integer multiple of the size of the ECC block (64 KB×n). Accordingly, the invalidated region unnecessary for reproduction of the content is also included in the tail portion of the encrypted stream for recording (i.e., encrypted data) in some cases. The invalidated region stores dummy data. In this case, the invalidated region of the tail portion, i.e., a sequence including a second invalidated region (i.e., the encrypted data including the invalidated region) is included in the encrypted AV clip. For this reason, recorder 413 stores the size of the second invalidated region, i.e., the size of the tail invalidated region in the sequence information (illustrated in FIG. 8) such that the content reproduction apparatus can specify the second invalidated region. In other words, recorder 413 records the size of the second invalidated region in recording medium 408.

Thus, through the encryption including the dummy data, content recording apparatus 401 can generate an encrypted stream for recording having a data length n times the length of the ECC block from the content having a variable-length packet structure. Accordingly, the recording of the encrypted AV clip to recording medium 408 is facilitated. Moreover, the content reproduction apparatus can easily specify the position of the invalidated region because the sequence information includes the information indicating the size of the invalidated region in the sequence.

One sequence does not always need to be recorded in continuous ECC blocks. In some cases, one sequence cannot be written into continuous ECC blocks in the case where recording medium 408 is fragmented due to repeated writing and deletion and the case where part of ECC blocks has physical defects.

In such cases, one sequence may be recorded continuously to some extent, and the following data may be written into an ECC block located in a slightly distant position. The stop position and the restart position of the writing also correspond to the boundaries of the ECC blocks in recording medium 408 in these cases.

[Content Editing Apparatus]

Figure 25:
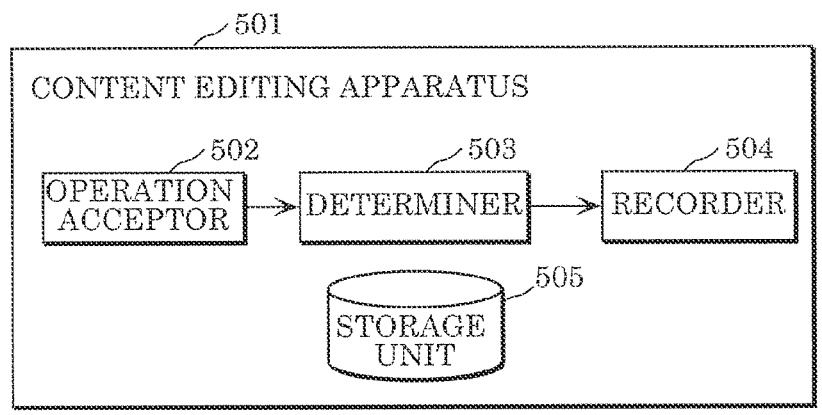
FIG. 25 is a diagram illustrating a configuration of a content editing apparatus according to an embodiment.
Figure 26:
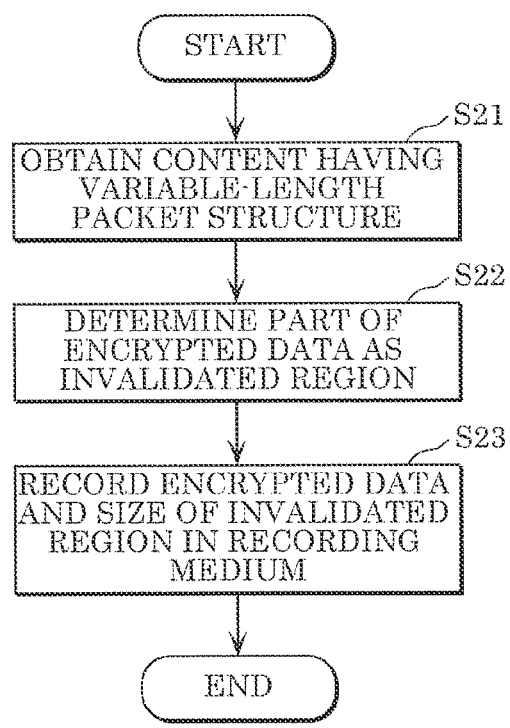
FIG. 26 is a flowchart illustrating an operation of a content editing apparatus according to an embodiment.

The content editing apparatus according to an embodiment will now be described. FIG. 25 is a diagram illustrating a configuration of the content editing apparatus according to an embodiment. FIG. 26 is a flowchart of an operation of the content editing apparatus according to the embodiment.

As illustrated in FIG. 25, content editing apparatus 501 includes operation acceptor 502, determiner 503, recorder 504, and storage unit 505.

Content editing apparatus 501 is a device which processes the encrypted data recorded in a block unit having a fixed length in recording medium 408. The encrypted data is an encrypted content having a variable-length packet structure, and specifically is a sequence included in the encrypted AV clip.

Operation acceptor 502 accepts the operation to edit the content of a user (S21). Operation acceptor 502 is a user interface such as a hardware device such as a remote controller, a keyboard, or a mouse. Operation acceptor 502 may be a graphical user interface (GUI) composed of a display device and a touch screen.

Determiner 503 determines part of the encrypted data as an invalidated region based on a user operation to delete part of the content, the user operation being accepted by operation acceptor 502 (S22). Determiner 503 is specifically implemented with a microcomputer, a processor, or a dedicated circuit.

Recorder 504 records the size of the invalidated region in recording medium 408 (S23). Recorder 504 is specifically implemented with a microcomputer, a processor, or a dedicated circuit. Determiner 503 and recorder 504 may be implemented as a single integrated circuit.

Storage unit 505 is a storage which stores the programs causing determiner 503 and recorder 504 to execute editing operation. Storage unit 505 is implemented with a semiconductor memory, for example.

[Specific Example of Editing of Content]

Figure 27:
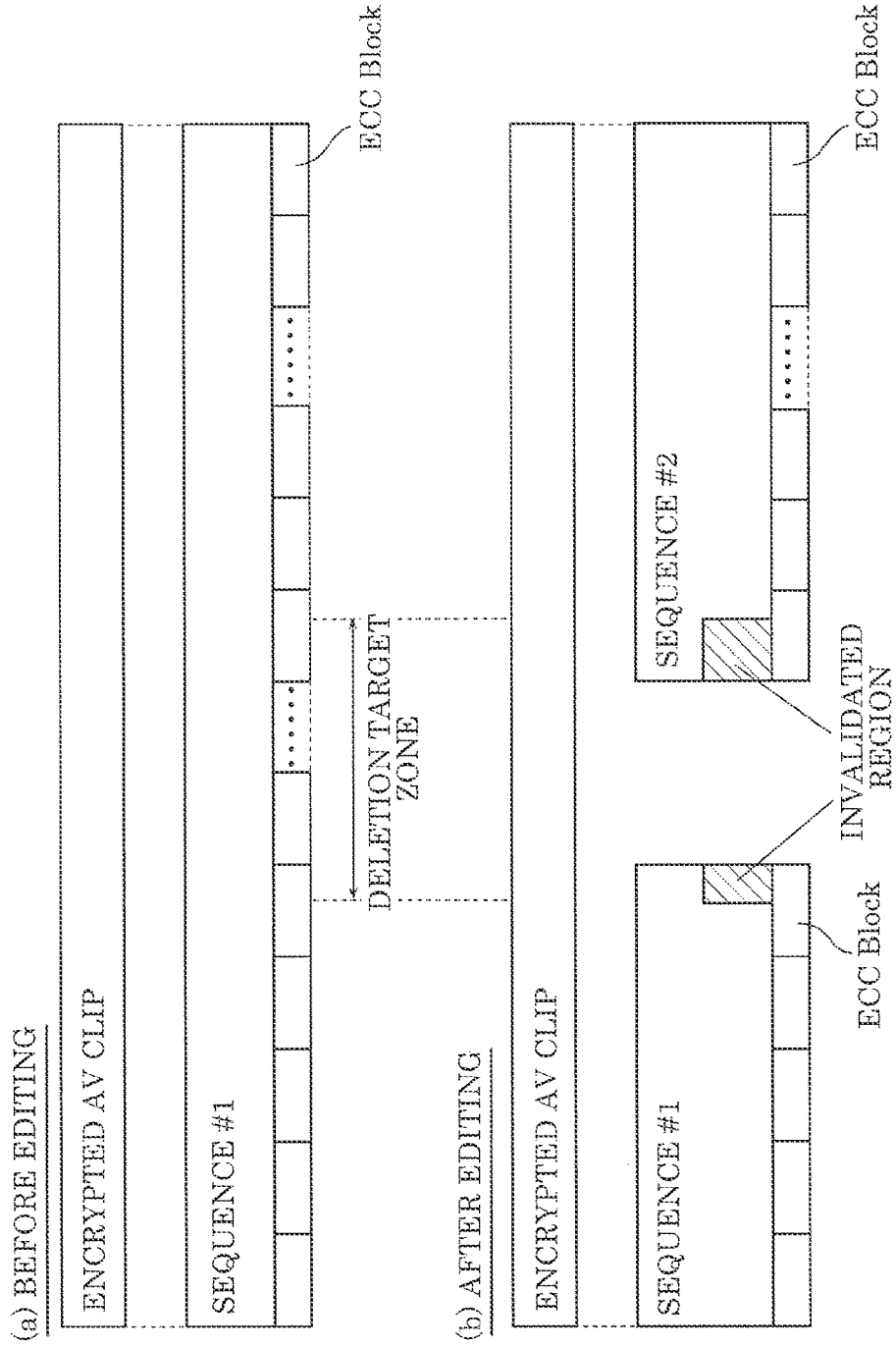
FIG. 27 is a schematic view illustrating one example of positions of invalidated regions generated when an encrypted AV clip is partially deleted.

A specific example of editing of a content will now be described. FIG. 27 is a schematic view illustrating one example of positions of invalidated regions generated in the case where the encrypted AV clip is partially deleted. To simplify the description, assume that any invalidated region is not present before editing of the encrypted AV clip in the example of FIG. 27.

When part of sequence #1 included in the encrypted AV clip before editing is determined as a deletion target zone (that is, the invalidated region) by determiner 503 as illustrated in (a) of FIG. 27, sequence #1 before editing is divided into sequence #1 after editing and sequence #2 after editing as illustrated in (b) of FIG. 27.

Usually, the boundary of the MMT/TLV packet at the tail end of sequence #1 after editing does not match the boundary of the ECC block. In other words, the tail portion of sequence #1 after editing includes part of the deletion target zone. In this case, the tail portion of sequence #1 after editing may store not only the MMT/TLV packet in a perfect format but also an imperfect MMT/TLV packet. Use of such an imperfect packet in reproduction of the content may cause malfunction because the size information in the leading end of the TLV packet indicates a wrong position.

To avoid such a problem, part of the deletion target zone in the tail portion of sequence #1 after editing (in other words, an excess portion) is managed as an invalidated region. In other words, the determination of the deletion target zone above is the determination of the invalidated region, and sequence #1 after editing is one example of the encrypted data after the invalidated region is determined, and is one example of first encrypted data including a first invalidated region in its tail portion.

Recorder 504 specifically stores the data size of the invalidated region in sequence #1 after editing as the size of the tail invalidated region in sequence #1 in the sequence information (FIG. 8). In other words, recorder 504 stores the size of the first invalidated region in recording medium 408. In this case, the data recorded in the tail end of the ECC block including the first invalidated region in sequence #1 after editing does not need to undergo processing such as re-encryption. Sequence #1 has a data length n times that of the ECC block, and the size (data length) of the first invalidated region is shorter than the data length of a single ECC block.

Usually, the leading position of sequence #2 after editing does not match the boundary of the ECC block. In other words, the leading portion of sequence #2 after editing includes part of the deletion target zone. In this case, the leading portion of sequence #2 after editing may store not only the MMT/TLV packet in a perfect format but also an imperfect MMT/TLV packet. If this imperfect packet is used in reproduction of the content by mistake, the leading portion thereof does not serve as the leading portion of the MMT/TLV packet and reproduction cannot be completely performed.

To avoid such a problem, part of the deletion target zone in the leading portion of sequence #2 (in other words, an excess portion) is managed as an invalidated region. In other words, the determination of the deletion target zone above is the determination of the invalidated region, and sequence #2 after editing is one example of the encrypted data after the invalidated region is determined, and is one example of second encrypted data including a second invalidated region in its leading portion.

Recorder 504 specifically stores the data size of the invalidated region in sequence #2 after editing as the size of the leading invalidated region in sequence #2 in the sequence information (FIG. 8). In other words, recorder 504 records the size of the second invalidated region in recording medium 408. Sequence #2 has a data length n times that of the ECC block, and the size (data length) of the second invalidated region is shorter than the data length of a single ECC block, for example.

Thereby, not only the data recorded in the leading ECC block including the second invalidated region but also the data recorded in the following ECC blocks do not have to undergo processing such as re-encryption.

[Content Reproduction Apparatus]

Figure 28:
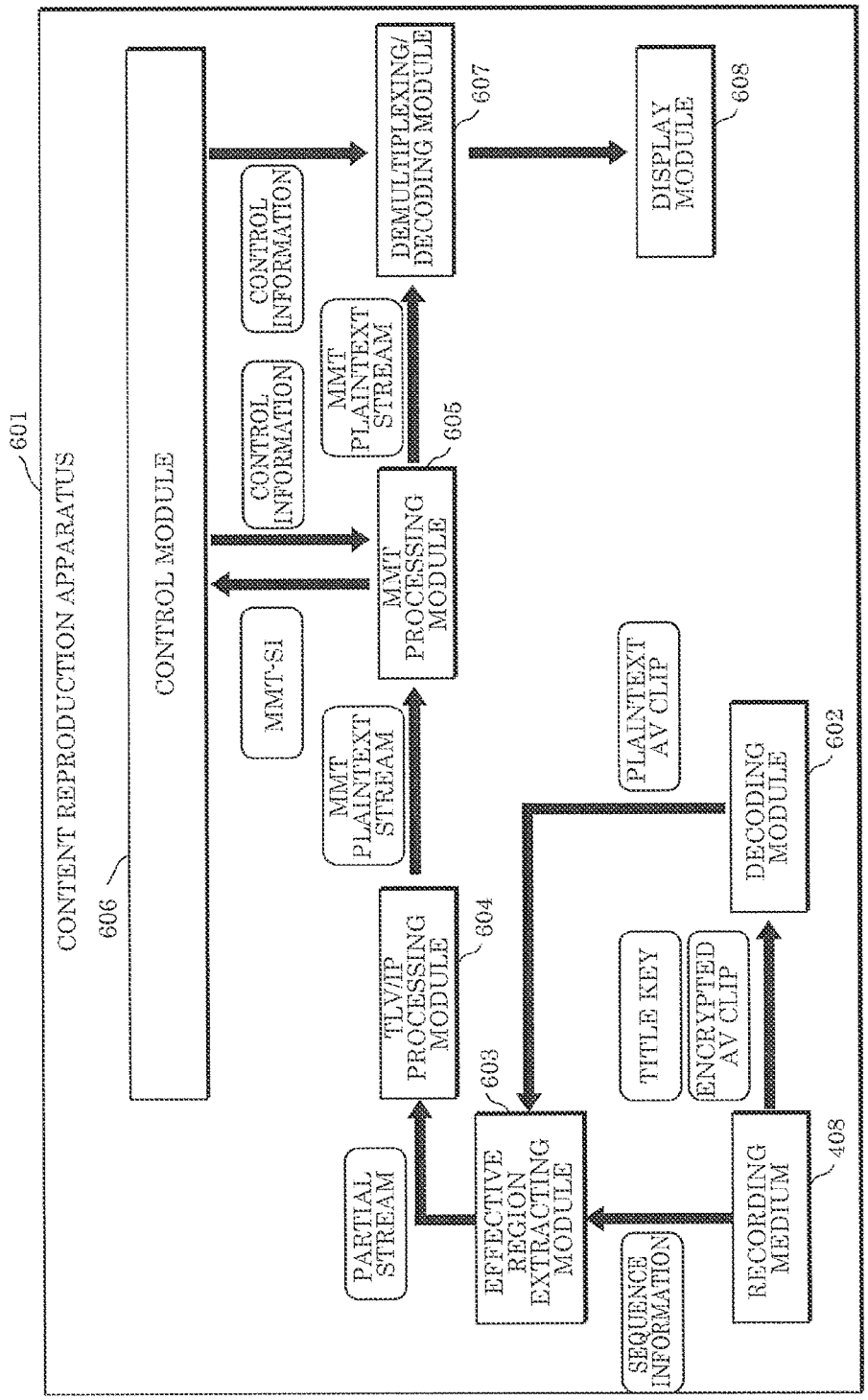
FIG. 28 is a diagram illustrating a configuration of a content reproduction apparatus according to an embodiment.

The content reproduction apparatus according to an embodiment will now be described. FIG. 28 is a diagram illustrating a configuration of the content reproduction apparatus according to an embodiment.

Content reproduction apparatus 601 illustrated in FIG. 28 reproduces the encrypted AV clip recorded using the content recording method above.

Content reproduction apparatus 601 is a BD player, for example. Content reproduction apparatus 601 may be a hard disk player. Content reproduction apparatus 601 reproduces the encrypted AV clip recorded in recording medium 408 while decoding the encrypted AV clip using the title key. Specifically, content reproduction apparatus 601 includes decoding module 602, effective region extracting module 603, TLV/IP processing module 604, MMT processing module 605, control module 606, demultiplexing/decoding module 607, and display module 608. These modules each are implemented with a microcomputer, a processor, or a dedicated circuit. These modules may be implemented as a single integrated circuit.

First, decoding module 602 reads the title key and the encrypted AV clip from recording medium 408. Decoding module 602 decodes the encrypted AV clip encrypted in encryption units using the title key to output a plaintext AV clip.

Effective region extracting module 603 reads the sequence information from recording medium 408. Specifically, effective region extracting module 603 reads the size of the leading invalidated region and the size of the tail invalidated region. Based on the size of the leading invalidated region and the size of the tail invalidated region which are read, effective region extracting module 603 deletes the invalidated regions from the plaintext AV clip input from decoding module 602 to extract only the effective regions (regions other than the invalidated regions) as a partial stream in the MMT/TLV format. Effective region extracting module 603 outputs the partial stream to TLV/IP processing module 604.

The processing performed by TLV/IP processing module 604 is slightly different from the processing performed by TLV/IP processing module 402. TLV/IP processing module 604 performs predetermined processing on the TLV header and the IP header in the partial stream to output the MMT plaintext stream to MMT processing module 605.

MMT processing module 605 performs MMT-SI processing as needed. MMT processing module 605 outputs the MMT-SI to control module 606. Control module 606 controls the operation of MMT processing module 605, and demultiplexing/decoding module 607 according to the information written in the MMT-SI.

Demultiplexing/decoding module 607 obtains a video or audio stream from the MMT plaintext stream output from the MMT processing module, and outputs the stream to display module 608. As a result, the content is reproduced.

Figure 29:
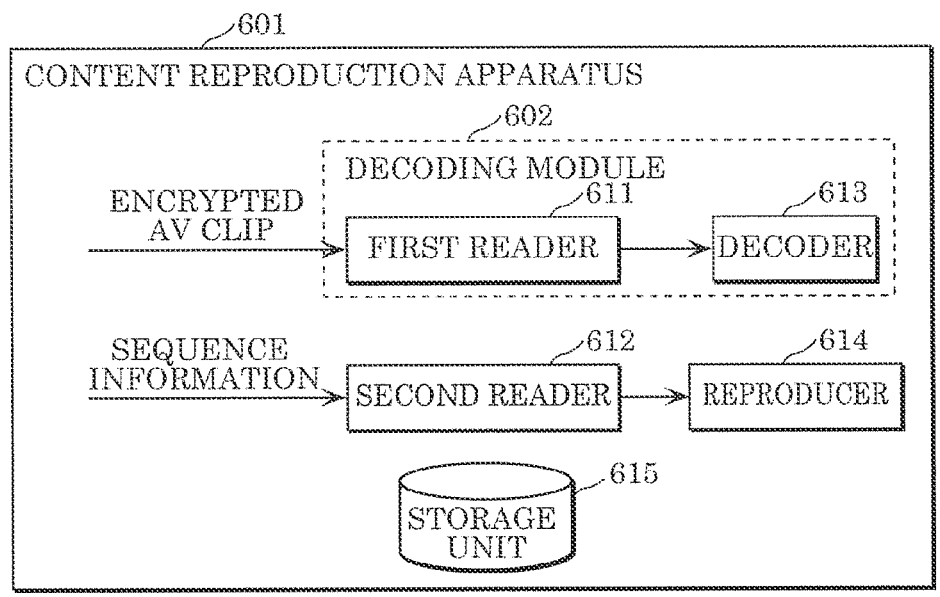
FIG. 29 is a block diagram illustrating a functional configuration of a content reproduction apparatus according to an embodiment.
Figure 30:
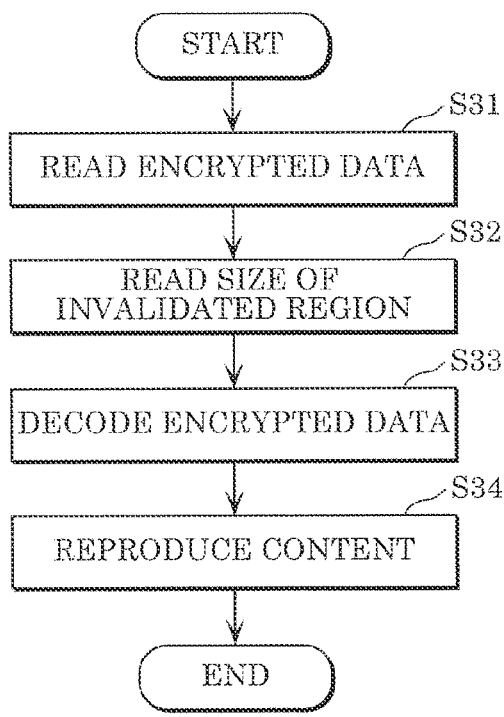
FIG. 30 is a flowchart illustrating an operation of a content reproduction apparatus according to an embodiment.

The functional configuration of content reproduction apparatus 601 may be implemented as in FIG. 29. FIG. 29 is a block diagram illustrating the functional configuration of content reproduction apparatus 601. FIG. 30 is a flowchart of the operation of content reproduction apparatus 601.

Content reproduction apparatus 601 illustrated in FIG. 30 processes the encrypted data recorded in a unit of a block having a fixed length in recording medium 408. The block having a fixed length is specifically an ECC block of 64 KB. The encrypted data is an encrypted content having a variable-length packet structure. The encrypted data includes invalidated regions unnecessary for reproduction of the content. Recording medium 408 records the size of the invalidated region. The size of the invalidated region is recorded in recording medium 408 as the sequence information.

Specifically, content reproduction apparatus 601 includes first reader 611, second reader 612, decoder 613, reproducer 614, and storage unit 615.

First reader 611 reads the encrypted data from recording medium 408 (S31). First reader 611 corresponds to part of decoding module 602. The encrypted data is specifically an encrypted AV clip or a sequence included in the encrypted AV clip.

Second reader 612 reads the size of the invalidated region from recording medium 408 (S32). Second reader 612 corresponds to part of effective region extracting module 603. Specifically, second reader 612 reads the sequence information.

Decoder 613 decodes the read encrypted data (S33). Decoder 613 corresponds to part of decoding module 602. The data obtained by decoding is specifically a plaintext AV clip.

Based on the size of the invalidated region read, reproducer 614 reproduces the content by extracting and outputting the remaining portion other than the invalidated regions of the data obtained by decoding (S34). Specifically, reproducer 614 corresponds to part of effective region extracting module 603, TLV/IP processing module 604, MMT processing module 605, control module 606, demultiplexing/decoding module 607, and display module 608, for example.

Storage unit 615 stores the programs causing first reader 611, second reader 612, decoder 613, and reproducer 614 to operate reproduction. Storage unit 615 is implemented with a semiconductor memory, for example. Each of first reader 611, second reader 612, decoder 613, and reproducer 614 is implemented with a microcomputer or a processor, for example, to execute the program above.

Such a content reproduction apparatus 601 can readily specify the position of the invalidated region.

[Effects]

As described above, content recording apparatus 401 includes obtaining unit 411 which obtains a content having a variable-length packet structure, encrypter 412 which generates encrypted data by encrypting the content, and recorder 413 which records the generated encrypted data in a block unit having a fixed length in a recording medium. The encrypted data includes invalidated regions unnecessary for reproduction of the content. Recorder 413 records the size of the invalidated region in recording medium 408. The content having a variable-length packet structure is a plaintext stream in an MMT/TLV format, for example. The block having a fixed length is an ECC block, for example.

The encrypted data is a sequence (or the encrypted stream for recording) included in the encrypted AV clip.

Such a content recording apparatus 401 facilitates control of the data length of the encrypted data so as to match the fixed length of the block, because the content including the invalidated regions is encrypted. Accordingly, the recording operation of the content is simplified. Moreover, content reproduction apparatus 601 can readily specify the position of the invalidated region because the size of the invalidated region is recorded in recording medium 408. Accordingly, the reproduction operation of the content is simplified.

Moreover, the tail portion of the encrypted data includes the first invalidated region as an invalidated region, for example. Recorder 413 records the size of the first invalidated region in recording medium 408.

According to such a content recording apparatus 401, content reproduction apparatus 601 can readily specify the position of the first invalidated region.

Moreover, the leading portion of the encrypted data includes the second invalidated region as an invalidated region, for example. The recorder records the size of the second invalidated region in recording medium 408.

According to such a content recording apparatus 401, content reproduction apparatus 601 can readily specify the position of the second invalidated region.

Moreover, the encrypted data has a data length n (n: natural number) times the fixed length of the block length, for example.

Such a content recording apparatus 401 facilitates the recording of the encrypted data in recording medium 408 because the data length of the encrypted data matches the fixed length of the block.

Content editing apparatus 501 processes the encrypted data recorded in block units each having a fixed length in recording medium 408. The encrypted data is an encrypted content having a variable-length packet structure. Content editing apparatus 501 includes determiner 503 which determines part of the encrypted data as an invalidated region, and recorder 504 which records the size of the invalidated region in recording medium 408.

Such a content editing apparatus 501 can delete part of the content without re-encrypting by treating the deletion target portion of the content as an invalidated region and recording the size of the invalidated region in recording medium 408.

Moreover, the tail portion of the encrypted data after the invalidated region is determined includes the first encrypted data including the first invalidated region as an invalidated region, for example. Recorder 504 records the size of the first invalidated region in recording medium 408.

Such a content editing apparatus 501 can delete part of the content without re-encrypting by treating the deletion target portion of the content as the first invalidated region and recording the size of the first invalidated region in recording medium 408.

Moreover, the leading portion of the encrypted data after the invalidated region is determined includes the second encrypted data including the second invalidated region as an invalidated region, for example. Recorder 504 records the size of the second invalidated region in recording medium 408.

Such a content editing apparatus 501 can delete part of the content without re-encrypting by treating the deletion target portion of the content as the second invalidated region and recording the size of the second invalidated region in recording medium 408.

Content reproduction apparatus 601 processes the encrypted data recorded in a block unit having a fixed length in recording medium 408. The encrypted data is an encrypted content having a variable-length packet structure. The encrypted data includes invalidated regions unnecessary for reproduction of the content. The size of the invalidated region is recorded in recording medium 408. Content reproduction apparatus 601 includes first reader 611 which reads encrypted data from recording medium 408, second reader 612 which reads the size of the invalidated region from recording medium 408, decoder 613 which decodes the read encrypted data, and reproducer 614 which reproduces the content by extracting and outputting the remaining portion other than the invalidated regions in the data obtained by decoding, based on the read size of the invalidated region.

Such a content reproduction apparatus 601 can readily specify the position of the invalidated region. Accordingly, the reproduction operation of the content is simplified.

Moreover, in the content recording method executed by a computer, a content having a variable-length packet structure is obtained, encrypted data is generated by encrypting the obtained content, and the generated encrypted data is recorded in a block unit having a fixed length in recording medium 408. The encrypted data includes invalidated regions unnecessary for reproduction of the content. In the content recording method, the size of the invalidated region is recorded in recording medium 408.

According to such a content recording method, the data length of the encrypted data is readily controlled so as to match the length of the block having a fixed length because the content including the invalidated regions is encrypted. Accordingly, the recording operation of the content is simplified. Moreover, content reproduction apparatus 601 can readily specify the position of the invalidated region because the size of the invalidated region is recorded in recording medium 408. Accordingly, the reproduction operation of the content is simplified.

The content editing method is performed on the encrypted data recorded in a block unit having a fixed length in recording medium 408, and is executed by a computer. The encrypted data is an encrypted content having a variable-length packet structure. In the content editing method, part of the encrypted data is determined as an invalidated region, and the size of the invalidated region is recorded in recording medium 408.

In such a content editing method, part of the content can be deleted without re-encrypting by treating the deletion target portion of the content as the invalidated region and recording the size of the invalidated region in recording medium 408.

The content reproduction method is performed on the encrypted data recorded in a block unit having a fixed length in recording medium 408, and is executed by a computer. The encrypted data is an encrypted content having a variable-length packet structure. The encrypted data includes invalidated regions unnecessary for reproduction of the content. The size of the invalidated region is recorded in recording medium 408. In the content reproduction method, the encrypted data is read from recording medium 408, the size of the invalidated region is read from recording medium 408, and the read encrypted data is decoded. Based on the read size of the invalidated region, the remaining portion other than the invalidated regions in the data obtained by decoding is extracted and output to reproduce the content.

According to such a content reproduction method, the position of the invalidated region can be readily specified. Accordingly, the reproduction operation of the content is simplified.

Other Embodiments

Although the embodiment has been described above, the embodiment should not be construed as limitative to this disclosure.

For example, the comprehensive or specific aspects of this disclosure may be implemented with devices, systems, methods, integrated circuits, computer programs, or recording media such as computer-readable CD-ROMs, or may be implemented with any combination of devices, systems, methods, integrated circuits, computer programs, and recording media. This disclosure may be implemented with as a program causing a computer to execute the content recording method, the content editing method, and the content reproduction method according to the embodiment above, or may be implemented with a non-transitory computer-readable recording medium on which such a program is recorded.

Moreover, in the embodiment above, the processing executed by a specific processor may be implemented by another processor. The order of the processings in the operations of the content recording apparatus, the content editing apparatus, and the content reproduction apparatus described in the above embodiment is one example. The order of the processings may be changed, or the processings may be executed in parallel.

The components in the embodiment above may be implemented by executing software programs suitable for the components, respectively. The components may be implemented by a program executer, such as a CPU or a processor, which reads and executes software programs recorded in a recording medium such as a hard disk or a semiconductor memory. The components may be implemented as a single CPU or processor.

Alternatively, the components may be implemented with hardware. Specifically, the components may be implemented with a circuit or an integrated circuit. These circuits may constitute a single circuit as a whole, or may be separated circuits. These circuits may be general-purpose circuits, or may be dedicated circuits.

Besides, embodiments made by a variety of modifications of the embodiment, conceived by persons skilled in the art, or embodiments implemented by any combination of components and functions of the embodiment without departing the gist of this disclosure are also included in this disclosure.

INDUSTRIAL APPLICABILITY

This disclosure can implement a recorder which can receive contents having an MMT/TLV packet structure and distributed through a next-generation 4K/8K broadcast or communication network, and record and edit the contents in a recording medium. Such a recorder can record the contents through simple buffer control, and can edit the contents without performing unnecessary re-encryption processing. This disclosure also can simplify the reproduction operation of a player which reproduces the contents recorded in the recording medium.

The invention claimed is:

1. A content recording apparatus, comprising:
a processor configured to:
obtain a content having a variable-length packet structure;
generate encrypted data by encrypting the content; and
record the encrypted data in a block unit having a fixed length in a recording medium, wherein
the encrypted data includes only one invalidated region unnecessary for reproduction of the content,
the processor is further configured to record a size of the only one invalidated region in the recording medium, and
the block unit having the fixed length has a size n times or 1/n times as large as a size of a minimal structural unit when data is read from and the data is written to the recording medium, where n is an integer equal to or greater than 1,
wherein the only one invalidated region is at a tail portion of the encrypted data, and
the processor is further configured to record a size of the only one invalidated region in the recording medium.

2. A content recording apparatus, comprising:
a processor configured to:
obtain a content having a variable-length packet structure;
generate encrypted data by encrypting the content; and
record the encrypted data in a block unit having a fixed length in a recording medium, wherein
the encrypted data includes only one invalidated region unnecessary for reproduction of the content,
the processor is further configured to record a size of the only one invalidated region in the recording medium, and
the block unit having the fixed length has a size n times or 1/n times as large as a size of a minimal structural unit when data is read from and the data is written to the recording medium, where n is an integer equal to or greater than 1,
wherein the only one invalidated region is at a leading portion of the encrypted data, and
the processor is further configured to record a size of the only one invalidated region in the recording medium.

3. A content recording method executed by a computer, the method comprising:
obtaining a content having a variable-length packet structure;
generating encrypted data by encrypting the content obtained;
recording the encrypted data in a block unit having a fixed length in a recording medium, the encrypted data including only one invalidated region unnecessary for reproduction of the content, wherein the only one invalidated region is at a tail portion of the encrypted data; and
recording a size of the only one invalidated region in the recording medium, wherein the block unit having the fixed length has a size n times or 1/n times as large as a size of a minimal structural unit when data is read from and data is written to the recording medium, where n is an integer equal to or greater than 1.

4. A content recording method executed by a computer, the method comrising:
obtaining a content having a variable-length packet structure;
generating encrypted data by encrypting the content obtained;
recording the encrypted data in a block unit having a fixed length in a recording medium, the encrypted data including only one invalidated region unnecessary for reproduction of the content, wherein the only one invalidated region is at a leading portion of the encrypted data; and
recording a size of the only one invalidated region in the recording medium, wherein the block unit having the fixed length has a size n times or 1/n times as large as a size of a minimal structural unit when data is read from and data is written to the recording medium, where n is an integer equal to or greater than 1.

* * * * *